US011117488B2

(12) United States Patent
Whitt et al.

(10) Patent No.: US 11,117,488 B2
(45) Date of Patent: Sep. 14, 2021

(54) SYSTEMS AND METHODS FOR MATCHING TRANSPORTATION REQUESTS TO PERSONAL MOBILITY VEHICLES

(71) Applicant: Lyft, Inc., San Francisco, CA (US)

(72) Inventors: Carlos Ellis Whitt, San Francisco, CA (US); Steven James Martisauskas, San Francisco, CA (US); Dor Levi, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 293 days.

(21) Appl. No.: 16/207,002

(22) Filed: Nov. 30, 2018

(65) Prior Publication Data

US 2019/0376802 A1 Dec. 12, 2019

Related U.S. Application Data

(60) Provisional application No. 62/681,661, filed on Jun. 6, 2018.

(51) Int. Cl.
*G01C 21/34* (2006.01)
*G01C 21/20* (2006.01)
(Continued)

(52) U.S. Cl.
CPC .............. *B60L 58/13* (2019.02); *B60Q 1/346* (2013.01); *B60Q 1/444* (2013.01); *B60R 25/245* (2013.01);
(Continued)

(58) Field of Classification Search
CPC ...... B60W 10/08; B60W 10/18; B60W 10/20; B60W 10/30; B60W 50/12;
(Continued)

(56) References Cited

U.S. PATENT DOCUMENTS 7,356,405 B1 * 4/2008 Nesbit ................ G01C 21/3453
701/425
7,627,422 B2 * 12/2009 Adamczyk ............. G06Q 10/06
701/516

(Continued)

FOREIGN PATENT DOCUMENTS

CN 104217583 A 12/2014
CN 104699686 A * 6/2015
(Continued)

OTHER PUBLICATIONS

Peter et al., "Automated Highway Lane Changes of Long Vehicle Combinations: A Specific Comparison between Driver Model Based Control and Non-Linear Model Predictive Control," 2015, Publisher: IEEE.*

(Continued)

Primary Examiner — Tuan C To
(74) Attorney, Agent, or Firm — Haynes and Boone, LLP

(57) ABSTRACT

The disclosed computer-implemented method may include matching transportation requests to personal mobility vehicles. A dynamic transportation network may incorporate different types of vehicles, such as bicycles and/or scooters. Certain vehicles may have advantages over other vehicles in certain contexts but be disadvantageous in others. For example, a dynamic transportation matching system may match a user transporting a bulky package with a basket-equipped bike rather than a scooter without a basket. Moreover, the dynamic transportation matching system may account for a wide variety of other factors, including but not limited to route features, ambient conditions, and vehicle status when matching a transportation requestor to a specific vehicle. Moreover, some systems may account for vehicle wear-and-tear, battery power levels, operational status, etc. to avoid matching users vehicles that would be unable to (Continued)

fulfill a transportation request. Various other methods, systems, and computer-readable media are also disclosed.

20 Claims, 14 Drawing Sheets

(51) Int. Cl.
| | |
|---|---|
| B60L 58/13 | (2019.01) |
| G07C 5/00 | (2006.01) |
| G06Q 10/02 | (2012.01) |
| G06Q 50/30 | (2012.01) |
| B60Q 1/34 | (2006.01) |
| B60Q 1/44 | (2006.01) |
| G06K 9/00 | (2006.01) |
| B60W 10/08 | (2006.01) |
| B60W 10/18 | (2012.01) |
| B60W 10/20 | (2006.01) |
| B60W 10/30 | (2006.01) |
| B60W 50/12 | (2012.01) |
| G08G 1/16 | (2006.01) |
| G08G 1/01 | (2006.01) |
| H04W 4/029 | (2018.01) |
| H04W 4/40 | (2018.01) |
| B60R 25/24 | (2013.01) |

(52) U.S. Cl.
CPC ............ *B60W 10/08* (2013.01); *B60W 10/18* (2013.01); *B60W 10/20* (2013.01); *B60W 10/30* (2013.01); *B60W 50/12* (2013.01); *G01C 21/20* (2013.01); *G01C 21/3415* (2013.01); *G01C 21/3423* (2013.01); *G01C 21/3438* (2013.01); *G01C 21/3461* (2013.01); *G01C 21/3492* (2013.01); *G06K 9/00798* (2013.01); *G06Q 10/02* (2013.01); *G06Q 50/30* (2013.01); *G07C 5/004* (2013.01); *G07C 5/008* (2013.01); *G08G 1/0125* (2013.01); *G08G 1/163* (2013.01); *G08G 1/165* (2013.01); *H04W 4/029* (2018.02); *H04W 4/40* (2018.02); *B60R 2325/205* (2013.01); *B60W 2300/365* (2013.01); *B60W 2510/244* (2013.01); *B60W 2552/00* (2020.02); *B60W 2552/15* (2020.02); *B60W 2710/086* (2013.01); *B60W 2710/18* (2013.01); *B60W 2710/20* (2013.01); *B60W 2710/30* (2013.01); *B60W 2720/10* (2013.01); *B62K 2202/00* (2013.01)

(58) Field of Classification Search
CPC ......... B60W 2552/00; B60W 2552/15; B60W 2300/365; B60W 2510/244; B60W 2710/086; B60W 2710/18; B60W 2710/20; B60W 2710/30; B60W 2710/10; B60L 58/13; H04W 4/029; H04W 4/40; B60Q 1/346; B60Q 1/444; B60R 25/245; G01C 21/20; G01C 21/3415; G01C 21/3423; G01C 21/3438; G01C 21/3461; G01C 21/3492; G06K 9/00798; G06Q 10/02; G06Q 50/30; G07C 5/004; G07C 5/008; B62K 2202/02
USPC ....................................................... 701/533
See application file for complete search history.

(56) References Cited

U.S. PATENT DOCUMENTS

| | | | | |
|---|---|---|---|---|
| 10,036,641 | B1* | 7/2018 | Hand | H04W 4/02 |
| 10,346,772 | B2* | 7/2019 | Mahmud | G06Q 10/06311 |
| 10,684,132 | B2* | 6/2020 | Johnston | G06F 16/29 |
| 10,828,999 | B1* | 11/2020 | Konrardy | B60L 53/36 |
| 2003/0177062 | A1 | 9/2003 | Chen | |
| 2008/0014908 | A1* | 1/2008 | Vasant | H04L 67/18 |
| | | | | 455/414.1 |
| 2008/0122605 | A1 | 5/2008 | Tengler et al. | |
| 2011/0133918 | A1 | 6/2011 | Lee et al. | |
| 2012/0143401 | A1 | 6/2012 | Jayadevappa et al. | |
| 2013/0046456 | A1 | 2/2013 | Scofield et al. | |
| 2013/0173146 | A1 | 7/2013 | Atmur et al. | |
| 2013/0231824 | A1* | 9/2013 | Wilson | G01C 21/3415 |
| | | | | 701/26 |
| 2015/0074004 | A1 | 3/2015 | Song | |
| 2015/0092056 | A1 | 4/2015 | Rau et al. | |
| 2015/0305426 | A1 | 10/2015 | Lee et al. | |
| 2016/0034845 | A1* | 2/2016 | Hiyama | G06Q 30/0633 |
| | | | | 705/7.15 |
| 2016/0069696 | A1 | 3/2016 | Salowitz | |
| 2016/0131492 | A1 | 5/2016 | Sheha et al. | |
| 2016/0306350 | A1 | 10/2016 | Shim et al. | |
| 2017/0011324 | A1* | 1/2017 | Truong | G06Q 50/32 |
| 2017/0030728 | A1 | 2/2017 | Baglino et al. | |
| 2017/0109764 | A1* | 4/2017 | Tripathi | G06Q 30/0202 |
| 2017/0167882 | A1* | 6/2017 | Paredes | G01C 21/3492 |
| 2017/0191845 | A1 | 7/2017 | Marueli et al. | |
| 2017/0232915 | A1* | 8/2017 | Dufford | G01C 21/343 |
| | | | | 701/48 |
| 2017/0236415 | A1 | 8/2017 | Okabe et al. | |
| 2017/0243492 | A1 | 8/2017 | Lambert et al. | |
| 2017/0364995 | A1 | 12/2017 | Yan | |
| 2018/0018840 | A1 | 1/2018 | Xia et al. | |
| 2018/0089605 | A1* | 3/2018 | Poornachandran | G06Q 30/0282 |
| 2018/0096445 | A1 | 4/2018 | Eyler et al. | |
| 2018/0114258 | A1 | 4/2018 | Ross et al. | |
| 2018/0356235 | A1* | 12/2018 | Jang | G01C 21/30 |
| 2019/0049968 | A1* | 2/2019 | Dean | G05D 1/0088 |
| 2019/0130318 | A1* | 5/2019 | Lee | G06Q 50/30 |
| 2019/0146509 | A1* | 5/2019 | Dean | G06N 20/00 |
| | | | | 701/25 |
| 2019/0360818 | A1* | 11/2019 | Linder | G06F 16/909 |

FOREIGN PATENT DOCUMENTS

| | | | | |
|---|---|---|---|---|
| CN | 105809087 A * | 7/2016 | | |
| DE | 102013222421 A1 * | 5/2014 | ............ | G07B 15/02 |
| EP | 2034451 A1 * | 3/2009 | ............ | G07B 15/063 |
| EP | 2 573 720 A1 | 3/2013 | | |
| EP | 3 188 141 A1 | 7/2017 | | |
| JP | 2008-037167 A | 2/2008 | | |
| JP | 2015-060452 A | 3/2015 | | |
| KR | 97-69562 A | 11/1997 | | |
| KR | 10-2012-0092361 A | 8/2012 | | |
| WO | 2017/194416 A1 | 11/2017 | | |
| WO | 2018/079590 A1 | 5/2018 | | |

OTHER PUBLICATIONS

Yuhua et al., "VShare: A Wireless Social Network Aided Vehicle Sharing System Using Hierarchical Cloud Architecture," 2016, Publisher: IEEE.*
Sukjin et al., "Reliable Vehicle Selection Algorithm with Dynamic Mobility of Vehicle in Vehicular Cloud System," 2017, Publisher: IEEE.*
Whitt et al., "Systems And Methods For Routing Personal Mobility Vehicles Based On Road Conditions", U.S. Appl. No. 16/235,699, filed Dec. 28, 2018, 66 pages.
Whitt et al., "Systems And Methods For Determining Allocation Of Personal Mobility Vehicles", U.S. Appl. No. 16/175,723, filed Oct. 30, 2018, 69 pages.
Whitt et al., "Systems And Methods For Battery-Driven Personal Mobility Vehicle Management In Dynamic Transportation Networks", U.S. Appl. No. 16/179,788, filed Nov. 2, 2018, 68 pages.
Whitt et al., "Apparatuses, Systems, And Methods For Increasing Safety In Personal Mobility Vehicle Operation", U.S. Appl. No. 16/181,325, filed Nov. 5, 2018, 81 pages.

(56) References Cited

OTHER PUBLICATIONS

Whitt et al., "Systems And Methods For Transport Completion Using Lane-Constrained Vehicles And Personal Mobility Vehicles", U.S. Appl. No. 16/206,999, filed Nov. 30, 2018, 99 pages.
Whitt et al., "Systems And Methods For Automated Signaling For Networked Personal Mobility Vehicles", U.S. Appl. No. 16/235,707, filed Dec. 28, 2018, 58 pages.

\* cited by examiner

SYSTEMS AND METHODS FOR MATCHING TRANSPORTATION REQUESTS TO PERSONAL MOBILITY VEHICLES

CROSS REFERENCE TO RELATED APPLICATION

This application claims the benefit of U.S. Provisional Application No. 62/681,661, filed 6 Jun. 2018, the disclosure of which is incorporated, in its entirety, by this reference.

BACKGROUND

Some transportation services may provide transportation on-demand, drawing from a pool of available personal mobility vehicles to meet the needs of individuals who seek to acquire transportation. In some cases, a dynamic transportation matching system may automatically match transportation requestors to personal mobility vehicles. Personal mobility vehicles may have related advantages and disadvantages. For example, a bike may be suitable for travel in adverse weather conditions, be able to travel at a relatively high maximum speed, etc. However, the same bike may be unsuitable for navigating roadway obstacles, such as closely-spaced bollards. As an additional example, a scooter may be suitable for travel along travel routes with relatively poor travel infrastructure such as no bike lanes and narrow sidewalks. However, the scooter may be unsuitable for use during rainy weather, and travel at a relatively low maximum speed. Therefore, improving the ability of a dynamic transportation matching system to pair transportation requestors with suitable personal mobility vehicles may improve overall user satisfaction and/or ensure that matched personal mobility vehicles are appropriate to the transportation request.

BRIEF SUMMARY

In an embodiment, a computer-implemented method may include receiving, by a dynamic transportation matching system, a transportation request from a requesting device. The computer-implemented method may further include analyzing the transportation request to identify at least one characteristic of the transportation request, wherein the at least one characteristic of the transportation request comprises at least an anticipated travel route of a transportation requestor associated with the requesting device. The computer-implemented method may further include evaluating, by the dynamic transportation matching system and based at least in part on the at least one characteristic of the transportation request, a fitness of matching a first personal mobility vehicle to the transportation request and a fitness of matching at least one additional personal mobility vehicle to the transportation request. The computer-implemented method may further include matching the requesting device to a personal mobility vehicle associated with the first personal mobility vehicle based at least in part on comparing the fitness of matching the first personal mobility vehicle to the transportation request against the fitness of matching the at least one additional personal mobility vehicle to the transportation request.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1A:
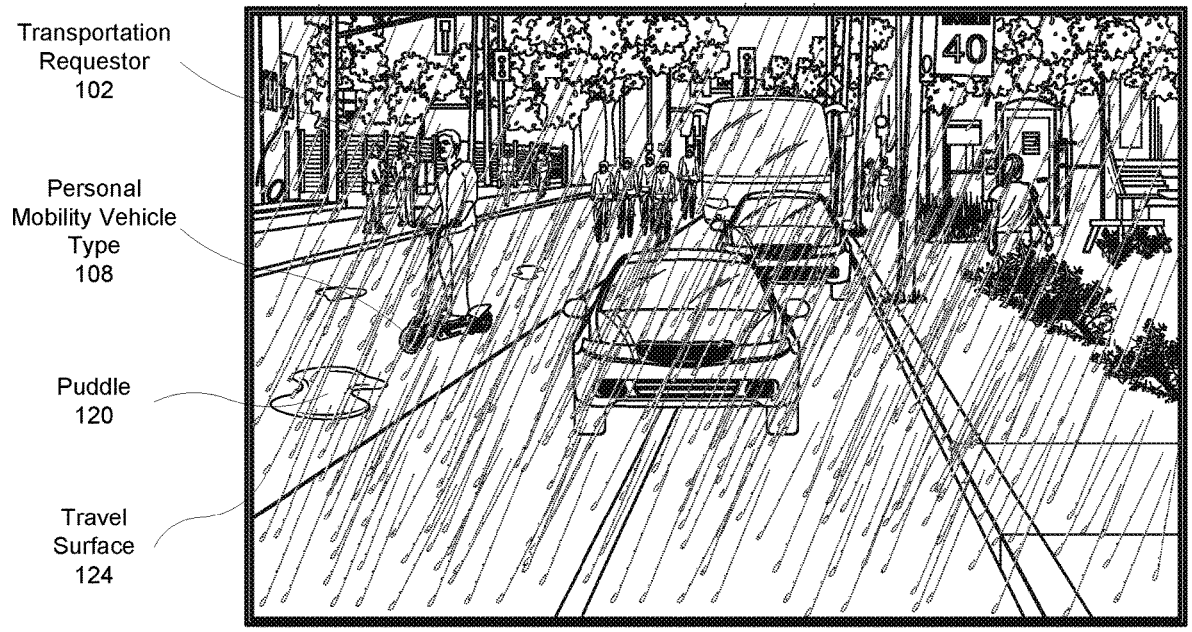
FIG. 1A is an illustration of a transportation requestor attempting to ride a scooter in rainy weather.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed towards matching transportation requests to personal mobility vehicles. Certain transportation systems or transportation networks may incorporate different types of vehicles, such as bicycles and/or scooters. However, certain vehicles may have advantages over other vehicles in certain contexts but be disadvantageous in others. For example, a dynamic transportation matching system may better serve a user transporting a bulky package by matching that user with a basket-equipped bike rather than a scooter without a basket.

Moreover, the dynamic transportation matching system may account for a wide variety of other factors, including but not limited to route features, ambient conditions, and vehicle status when matching a transportation requestor to a specific vehicle. Moreover, some systems may account for vehicle wear-and-tear, battery power levels, operational status, etc. to avoid matching users to vehicles that would be unable to fulfill a transportation request. For example, an electric scooter with 1 mile of range left in its battery would be unsuitable for fulfilling a transportation request that expects to travel 3 miles. Such a matching system may therefore provide a variety of benefits to transportation vendors and/or users. For example, the systems and methods described herein may increase user satisfaction by matching transportation requests to the most suitable vehicle for a particular situation. Additionally, the systems and methods described herein may reduce the amount of maintenance a vendor must perform on their fleet of vehicles by distributing requests across a fleet of vehicles rather than wearing out a small number of vehicles.

As may be appreciated from the above descriptions, the systems and methods described herein may improve the functioning of a computer and/or computer system that implements dynamic transportation matching. For example, these systems may improve the functioning of a computer and/or computer system by improving dynamic transportation matching results. Furthermore, for at least the reasons mentioned above and to be discussed in greater detail below, the systems and methods described herein may provide benefits to dynamic transportation management and/or the field of personalized transportation. Moreover, these systems and methods may provide advantages to individual personal mobility vehicles (whether piloted by a human driver or operating autonomously) that operate as part of a dynamic transportation network. For example, the dynamic transportation system may automatically match users to a suitable vehicle without requiring user input beyond the submission of the original transportation request.

As will be explained in greater detail below, a dynamic transportation matching system may arrange transportation on an on-demand and/or ad-hoc basis by, e.g., matching one or more transportation requestors and/or transportation requestor devices with one or more transportation providers and/or transportation provider devices. For example, a dynamic transportation matching system may match a transportation requestor to a transportation provider that operates within a dynamic transportation network (e.g., that is managed by, coordinated by, and/or drawn from by the dynamic transportation matching system to provide transportation to transportation requestors). Transportation requestors may interact with dynamic transportation matching systems through requesting devices.

As used herein, the term "requesting device" may refer to any of a variety of computing devices and the like that are capable of executing computer-readable instructions that cause the computing device to request transportation and/or access to personal mobility vehicles from the dynamic transportation system. In some examples, a requesting device may incorporate a geolocation module, such as a global positioning system (GPS) receiver and provide geolocation data to the dynamic transportation matching system as part of issuing the request for transportation. Additionally or alternatively, the requesting device may interact with the dynamic transportation system over a network, as will be described in greater detail below. In some embodiments, the requesting device may be configured to execute an app that facilitates requesting transportation from the dynamic transportation matching system. Examples of requesting devices include, without limitation, transportation kiosks, personal computers, smart mobile devices including phones (e.g., IPHONE and/or ANDROID phones), tablets (e.g., IPAD), laptops, smart glasses, smart watches, combinations of one or more of the same, and/or any other computing device through which a transportation requestor may request transportation from a dynamic transportation matching system.

In some examples, available sources of transportation within a dynamic transportation network may include vehicles that are owned by an owner and/or operator of the dynamic transportation matching system. Additionally or alternatively, sources of transportation within a dynamic transportation network may include vehicles that are owned outside of the dynamic transportation network but that participate within the dynamic transportation network by agreement. In some examples, the dynamic transportation network may include lane-constrained vehicles (e.g., cars, light trucks, etc.). Furthermore, in some examples, as will be explained in greater detail below, the dynamic transportation network may include personal mobility vehicles.

As used herein, the term "personal mobility vehicle" (or "PMV") may refer to any of a variety of types of vehicles that may be smaller and/or lighter than traditional lane-constrained vehicles (e.g., cars, trucks, motorcycles, and the like). In some examples, a personal mobility vehicle may have fewer than four wheels. In some examples, personal mobility vehicles may be more flexible, maneuverable, and may be provided access to particular portions of a road way (e.g., bike lane, sidewalk, etc.) that traditional automobiles may not legally be able to access. Personal mobility vehicles may be human and/or motor powered and may have any suitable sized and/or powered motor to allow the personal mobility vehicle to travel any suitable speed and carry any suitable load. In some embodiments, without limitation, a personal mobility vehicle may operate with less than about five horsepower, less than about four horsepower, or less than about three horsepower. Notwithstanding the above examples, PMVs may operate at any suitable horsepower level (e.g., significantly higher horsepower levels). In various examples, without limitation, a personal mobility vehicle may weigh less than about 150 pounds, less than about 100 pounds, less than about 70 pounds, or less than about 50 pounds. Notwithstanding the above examples, PMVs may have any suitable weight. In various examples, without limitation, a personal mobility vehicle may operate at a maximum speed (e.g., absent downhill acceleration) of about 35 miles per hour or less, about 30 miles per hour or less, about 25 miles per hour or less, or about 20 miles per hour or less. Notwithstanding the above examples, PMVs may operate at any suitable speed (including, e.g., significantly higher speeds).

In some examples, a personal mobility vehicle may be designed to transport a single passenger. However, in some embodiments, the personal mobility vehicles may also transport more than a single passenger (e.g., a tandem bicycle). In some examples, a personal mobility vehicle may be partially or fully self-powered (e.g., through a combustion motor or an electric motor). In some examples, a personal mobility vehicle may be partially or fully human-powered. Examples of personal mobility vehicles include, without limitation, scooters, pedaled bicycles, and electric bicycles.

Personal mobility vehicles may be capable of travelling across a variety of infrastructure. For example, personal mobility vehicles may be capable of traversing travel infrastructure designed for lane-constrained vehicles (e.g., automobiles, busses, trucks, vans, motor homes, motorcycles, etc.) that are designed to transport a driver and one or more passengers and/or cargo on roads and/or highways. Additionally or alternatively, personal mobility vehicles may be capable of traversing and/or permitted to traverse travel infrastructure that lane-constrained vehicles are incapable of traversing. For example, a personal mobility vehicle may be capable of travelling on sidewalks, down narrow alleys, and/or through designated pedestrian routes. Similarly, personal mobility vehicles may be permitted to travel through areas that are forbidden to lane-constrained vehicles. For example, personal mobility vehicles may be permitted to traverse a roadway that is closed to larger vehicular traffic but open to pedestrians (e.g., during a street festival).

Use of a personal mobility vehicle to fulfill all or part of a transportation request may reduce congestion of lane-constrained vehicles surrounding high-traffic areas by providing more versatile and/or agile methods of transportation in the form of personal mobility vehicles, especially for transportation requests that do not otherwise require a lane-constrained vehicle. For example, and as described above, personal mobility vehicles may be capable of traversing a wider variety of infrastructure than lane-constrained vehicles. As an additional example, personal mobility vehicles may more easily traverse congested roadways by virtue of being smaller and more agile than lane-constrained vehicles.

In some examples, a dynamic transportation matching system may match transportation requestors to personal mobility vehicles. For example, the dynamic transportation matching system may determine that a starting location of a transportation requestor is near an available personal mobility vehicle within the dynamic transportation network; provide, to the transportation requestor, directions to the personal mobility vehicle; and transmit instructions to the personal mobility vehicle to unlock and/or activate for the transportation requestor. The transportation requestor may then ride the personal mobility vehicle to a destination.

Certain types of PMV may offer certain advantages and/or suffer drawbacks compared to other types of PMV depending on the context in which those PMVs may be used. FIG. 1A is an illustration of a transportation requestor 102 attempting to ride a scooter (i.e., personal mobility vehicle type 108) in rainy weather may encounter a puddle 120 while traversing travel surface 124. Personal mobility vehicle type 108 may not be equipped with wheels that are capable of safely navigating puddle 120 or travel surface 124 while travel surface 124 is wet. Bikes may instead be safer for transportation requestors when travel surfaces are slippery, such as during the rainy weather illustrated in FIG. 1A.

Figure 1B:
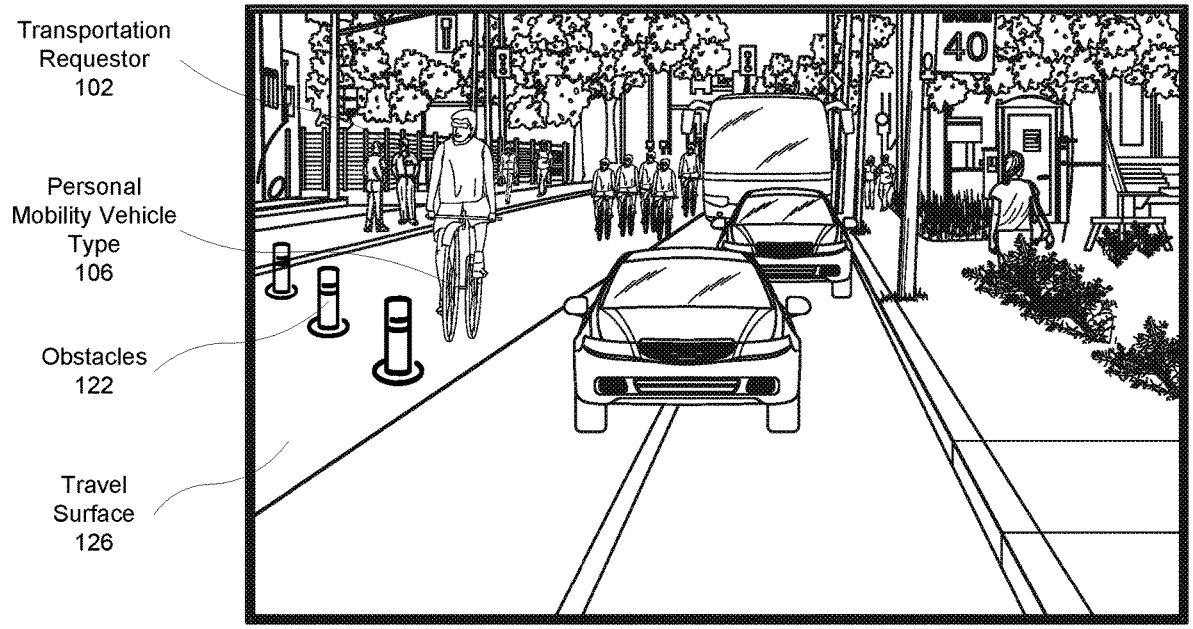
FIG. 1B is an illustration of a transportation requestor attempting to ride a bike through an obstructed walkway.

As an additional example, scooters may be more agile and be more suitable than bikes for transportation requestors who may need to navigate narrower sidewalks and/or roadway obstacles such as bollards. FIG. 1B is an illustration of transportation requestor 102 attempting to ride a personal mobility vehicle type 106 (i.e., a bike) across a travel surface 126 that is obstructed by obstacles 122 that are designed to obstruct certain types of vehicular traffic while permitting pedestrians and smaller vehicles to pass. Personal mobility vehicle type 106 may be too large and/or cumbersome to safely navigate obstacles 122.

A dynamic transportation matching system may maintain information that designates personal mobility vehicle type 106 (i.e., bikes) as suitable for use in rainy weather but unsuitable for use if an anticipated travel route must navigate closely-spaced obstacles. Similarly, the dynamic transportation matching system may maintain information that designates personal mobility vehicle type 108 (i.e. scooters) unsuitable for use during rainy weather but preferred for navigating closely-spaced obstacles. Although only two types of personal mobility vehicle in two different scenarios are illustrated in FIGS. 1A and 1B, a dynamic transportation matching system may manage any number of personal mobility vehicle types. Moreover, the dynamic transportation matching system may match users to specific models of PMV within broader categories (e.g., a specific model of scooter) based on the capabilities and designs of those models and/or types of PMV. For example, the dynamic transportation matching system may match requesting devices to specific models of PMV based on determining that the transportation request requires a PMV with at least a certain battery level (e.g., to ensure that the PMV is capable of covering a declared travel route without running out of power), a certain average speed, a distance of the user's travel route, a torque and/or power output of an engine of the PMV, etc.

The same dynamic transportation matching system may also track and/or determine PMV suitability in any number of different contexts. For example, the dynamic transportation matching system may consider one type of PMV to be more suitable for a user in rainy weather, as illustrated in FIG. 1A, while considering a different type of PMV to be more suitable for the same user in clear, dry weather as illustrated in FIG. 1B. In the example of FIG. 1A, the dynamic transportation matching system may match transportation requestor 102 to personal mobility vehicle type 108 to ensure that transportation requestor 102 is able to navigate hazards such as puddle 120 and safely travel across travel surface 124 despite the rainy weather. In the example of FIG. 1B, the dynamic transportation matching system may match transportation requestor 102 to personal mobility vehicle type 106 based on the presence of obstacles 122, as well as other aspects of travel surface 126, which will be discussed in greater detail below. The dynamic transportation matching system may also match transportation requestor 102 to personal mobility vehicle type 106 to minimize travel time, given that the clear weather permits optimization for factors besides inclement weather. Similarly, and as will be described in greater detail below, the dynamic transportation matching system may consider certain PMV types to be more or less suitable based on local infrastructure, traffic conditions, and the like.

Figure 2:
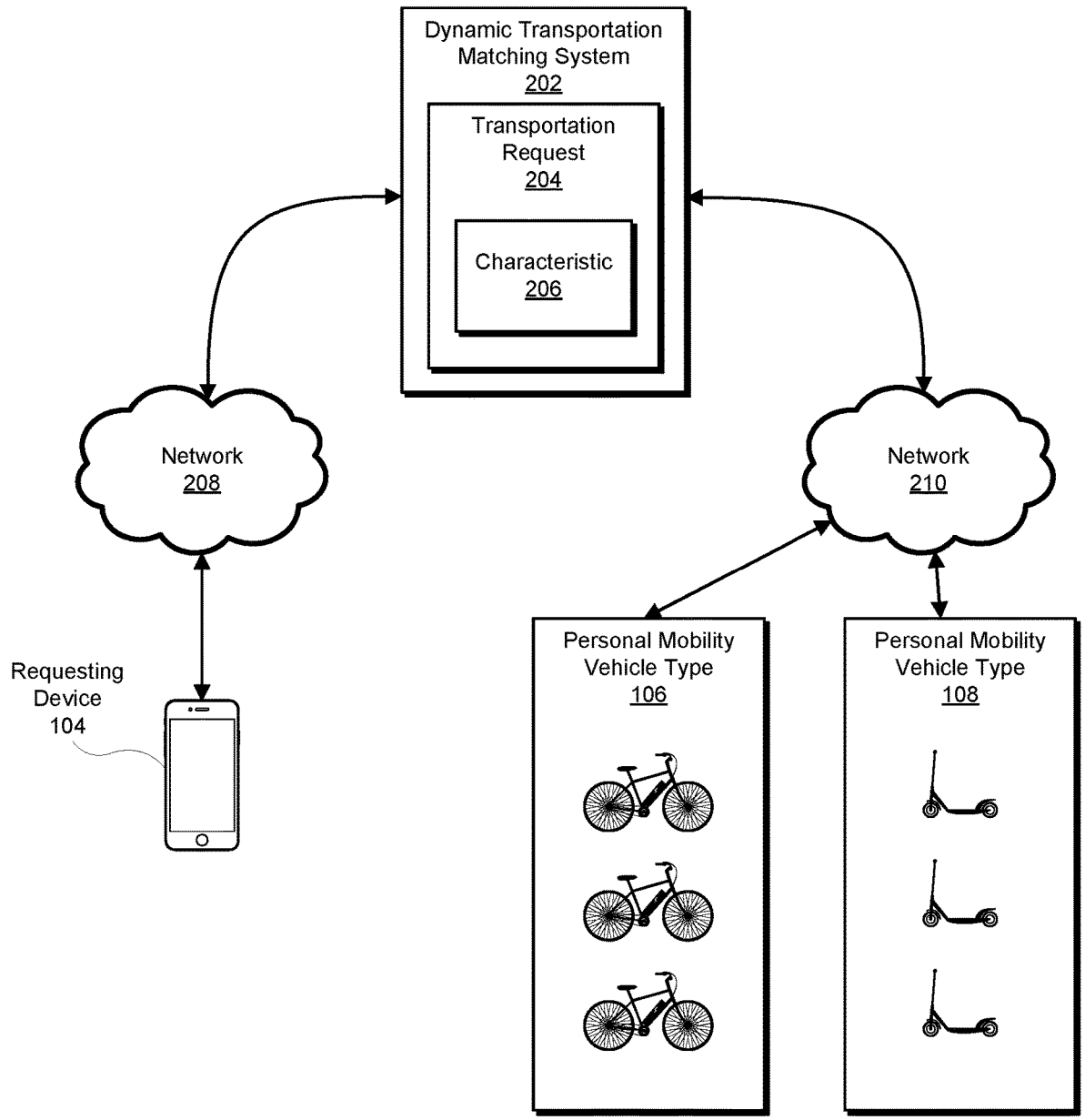
FIG. 2 is a block diagram of an example service network that incorporates a dynamic transportation matching system.

FIG. 2 illustrates an example system where a dynamic transportation matching system mediates transportation requests for requesting devices. In general, dynamic transportation matching system 202 may receive transportation requests from requesting device 104, then communicate with various personal mobility vehicles and/or perform lookups in a database of personal mobility vehicles to determine an ideal personal mobility vehicle type to fulfill transportation request 204. For example, dynamic transportation matching system 202 may match requesting device 104 to a broad category of PMV, such as 'scooter' or 'bike.' In further examples, dynamic transportation matching system 202 may match requesting device 104 to a specific type or model of PMV within a broader category, based on the capabilities of those different types or models of PMV. In some examples, and as illustrated in FIG. 2, each PMV type may represent a pool or collection of vehicles. In the example of FIG. 2, personal mobility vehicle type 106 includes three bicycles, whereas personal mobility vehicle type 108 includes three scooters. Each PMV may be equipped with sensors, onboard computers, wireless communications devices, and/or other electronics that enable each vehicle to communicate with the dynamic transportation matching system over a network, illustrated in FIG. 2 as dynamic transportation matching system 202 and network 210, respectively. Dynamic transportation matching system 202 may receive transportation request 204 from requesting device 104 via network 208. Dynamic transportation matching system 202 may then extract characteristic 206 from transportation request 204, as will be described in greater detail below. Although PMVs of a given type are shown in the same box in FIG. 2, PMVs of a particular type may be spread across a geographical area. For example, dynamic transportation matching system 202 may track and match dozens, hundreds, or thousands of electric scooters distributed throughout a city and/or region.

Figure 3:
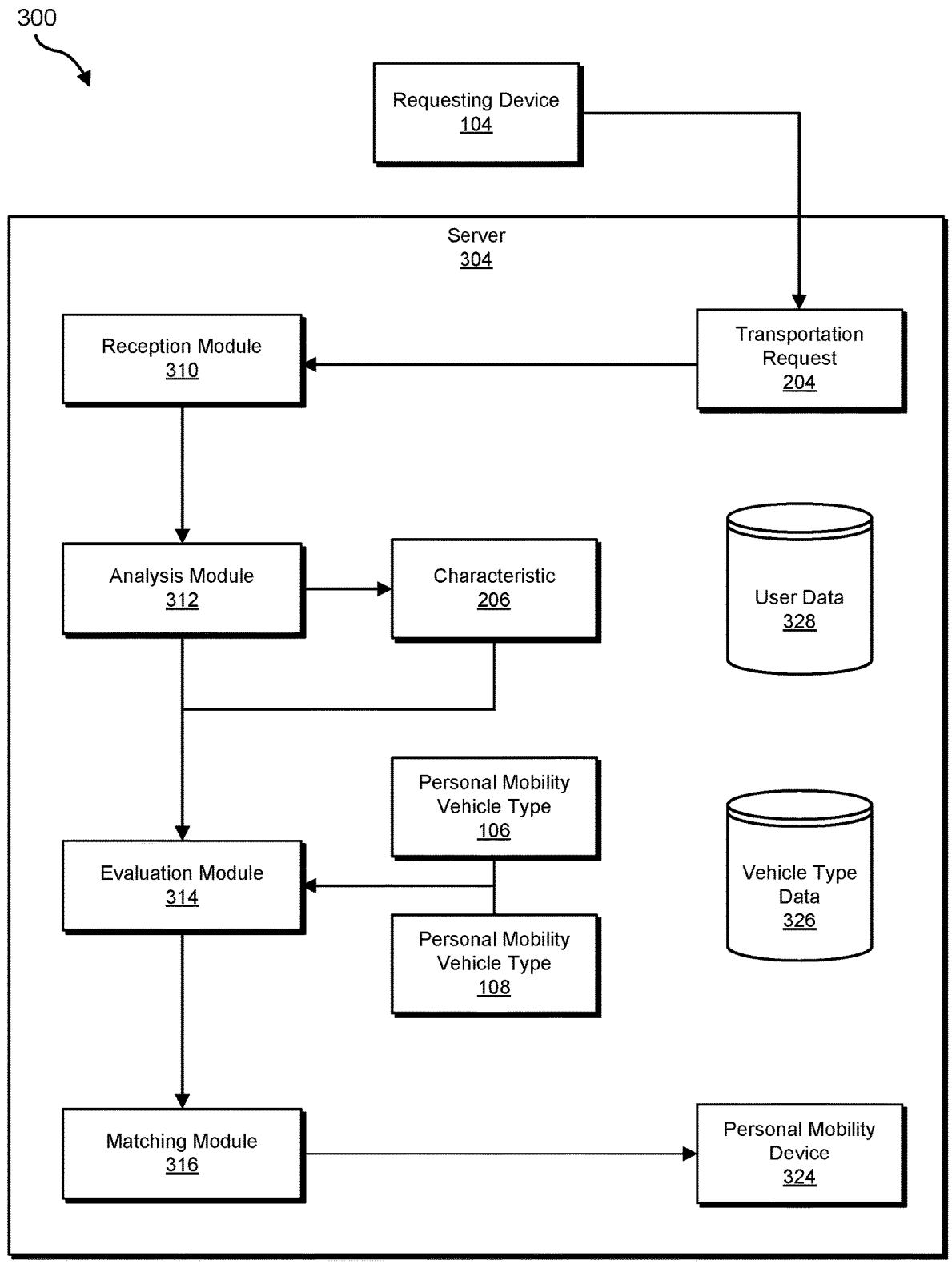
FIG. 3 is a block diagram of an example system for matching transportation requests to personal mobility vehicles.

Dynamic transportation matching system 202 may execute as part of a server operated by a vendor of transportation services. FIG. 3 is a block diagram of an example system of a server that is programmed to execute dynamic transportation matching system 202. Although networks are not illustrated in FIG. 3, the server, which is illustrated as dynamic transportation matching system 202, may communicate with requesting device 104 and/or personal mobility vehicles over network 208 and/or network 210 as illustrated in FIG. 2.

Dynamic transportation matching system 202 may be programmed to execute a variety of software modules as part of processing transportation. For example, dynamic transportation matching system 202 may be programmed to execute a reception module 310 that receives transportation request 204 either from or as part of dynamic transportation matching system 202.

Reception module 310 may receive transportation request 204 in a variety of contexts. For example, a user may cause requesting device 104 to issue transportation request 204 to dynamic transportation matching system 202, thereby prompting dynamic transportation matching system 202 to provide all or a portion of transportation request 204 to reception module 310. Furthermore, transportation request 204 may include a variety of information, as will be described in greater detail below.

In some embodiments, characteristic 206 may include an anticipated travel route of a transportation requestor associated with requesting device 104 (e.g., transportation requestor 102 as illustrated in FIG. 1). As will be described in greater detail below, one or more of the systems described herein may analyze characteristic 206 when determining a suitable PMV type to fulfill transportation request 204. Characteristic 206 may include features of the travel route, such as the distance that will be covered by the anticipated travel route, a type of travel surface along a portion of the anticipated travel route, a slope of a travel surface along a portion of the anticipated travel route, a type of travel infrastructure present along a portion of the anticipated travel route, and/or any other feature of the anticipated travel route that may be more suited to one PMV type over another. Types of travel infrastructure along an anticipated travel route may include, without limitation, presence and/or quality of bike lanes (e.g., physically separated from other vehicular traffic), presence and/or quality of sidewalks (e.g., width, presence of obstacles, etc.), presence and/or quality of other pedestrian paths, overpasses, underpasses, presence of obstacles to vehicular traffic (e.g., safety bollards), and the like that may affect whether certain types of PMV are capable of safely traversing a travel route. For example, a bike may be well-suited to a travel route that includes wide bike lanes even if that route does not include sidewalks. By contrast, a scooter may be more suited to a travel route that includes wide sidewalks with few or no obstacles. As will be described in greater detail below, the systems and methods described herein may account for these route features when determining which type of PMV would best fulfill transportation request 204.

Dynamic transportation matching system 202 may derive these travel route characteristics from a mapping system maintained by the vendor that operates dynamic transportation matching system 202. For example, a vendor may maintain a mapping database of a service area that associates the above-described route features with physical locations.

Networks 208 and 210 may generally represent any medium or architecture capable of facilitating electronic communication and/or data transfer. Examples of networks 208 and 210 may include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), combinations of one or more of the same, or the like. Network 404 may facilitate communication or data transfer using wireless or wired connections. In the example of FIG. 2, networks 208 and 210 facilitate communication between dynamic transportation matching system 202, requesting device 104, and various PMVs included in personal mobility vehicle types 106 and 108.

In some examples, transportation request 204 may include a requestor identifier of a transportation requestor that submitted transportation request 204 via requesting device 104. For example, transportation request 204 may include an account identifier that identifies a user account registered with a vendor that operates dynamic transportation matching system 202. The systems and methods described herein may use this requestor identifier to search user data 328 for user data and/or a user profile associated with the requestor identifier. This user data and/or user profile may include a variety of information about an individual, such as that user's PMV preferences (e.g., prefers bikes over scooters), an ability of the user to interact with personal mobility devices (e.g., is unable to use scooters), desired safety features, transport capability requirements (e.g., must be matched to a PMV capable of carrying a bulky package), and/or any other suitable information about the transportation requestor.

In some embodiments, requesting device 104 may include geolocation data as part of transportation request 204. This geolocation data may indicate a current location of requesting device 104. For example, a smart phone running a transportation-request app may include GPS data to indicate its current position when submitting transportation request 204 to dynamic transportation matching system 202. Alternatively, the geolocation data may indicate an expected future position of requesting device 104 in conjunction with a time at which a transportation requestor expects requesting device 104 to be present at the expected future position. For example, a transportation requestor may request a reservation to use a PMV from a specific location at a specific time. As an additional example, a transportation requestor may indicate that they would prefer to arrive at their destination within a certain amount of time.

In further embodiments, transportation request 204 may include a group identifier that indicates whether requesting device 104 is requesting transportation as part of a group. The group identifier may also specify which group, if applicable, includes requesting device 104. As will be described in greater detail below, one or more of the systems described herein may use a group indicator to ensure that groups of transportation requestors are assigned suitable PMVs that will allow them to travel as a group.

Returning to FIG. 3, dynamic transportation matching system 202 may be programmed to execute an analysis module 312 that analyzes transportation request 204 to identify at least one characteristic, illustrated as characteristic 206, from transportation request 204.

Analysis module 312 may identify and/or extract a variety of characteristics from transportation request 204. As described above, transportation request 204 may include a variety of information. In some examples, analysis module 312 may simply extract an item of information from transportation request 204 and directly use that information as characteristic 206. For example, analysis module 312 may extract physical location information, such as current GPS coordinates, from transportation request 204 and use that information as characteristic 206 without further processing. In further examples, analysis module 312 may parse or otherwise process information extracted from transportation request 204 into a string, numerical value, token, or other form of representing the information extracted from transportation request 204. For example, analysis module 312 may extract an anticipated travel route from transportation request 204 and translate the anticipated travel route into a variety of route features, as will be described in greater detail below.

In some examples, analysis module 312 and/or other elements of a dynamic transportation matching system may identify multiple characteristics of transportation request 204. Some of these characteristics may be derived directly from transportation request 204, as described above. Additionally or alternatively, analysis module 312 may derive characteristics of transportation request 204 based on information from outside sources. For example, analysis module 312 may query a weather service to determine weather conditions at the time when the transportation requestor is expected to embark upon the anticipated travel route. The systems and methods described herein may use this environmental information as part of determining a suitable PMV type to fulfill transportation request 204. For example, dynamic transportation matching system 202 may avoid matching scooters when it is raining and instead fulfill transportation requests by instead preferentially matching bikes equipped with better-gripping tires.

Figure 4:
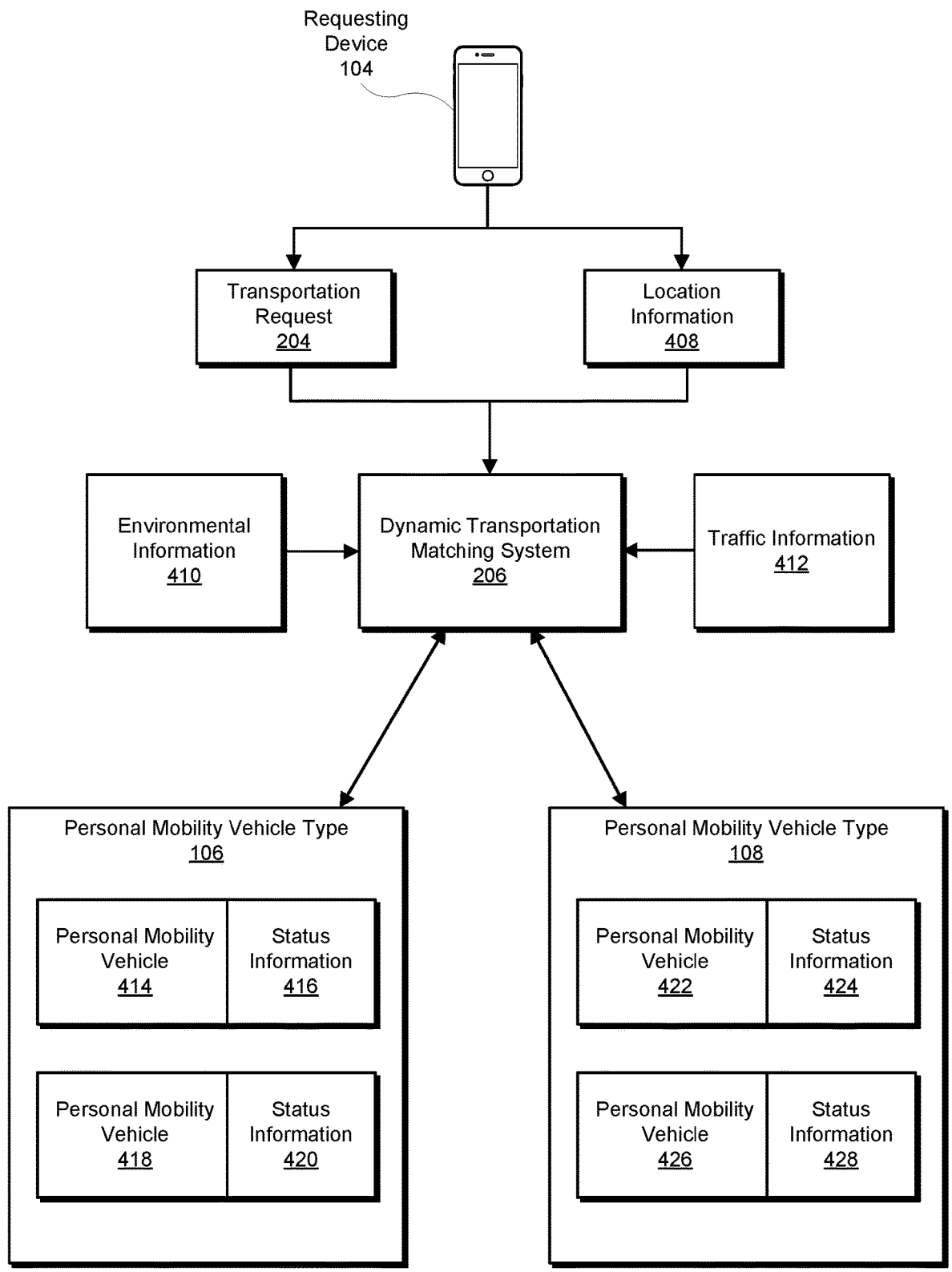
FIG. 4 is a block diagram of an example system for matching transportation requests to personal mobility vehicles based on information from multiple sources.

FIG. 4 is a block diagram of an example system that processes information from multiple sources. In this example, analysis module 312, although not directly illustrated in FIG. 4, may execute as part of dynamic transportation matching system 206. As illustrated in FIG. 4, dynamic transportation matching system 120 may receive transportation request 204. Requesting device 104 may also provide location information 408 to dynamic transportation matching system 206 as part of submitting transportation request 204. Furthermore, dynamic transportation matching system 120 may also receive environmental information 410 from a weather and pollution tracking service and receive traffic information 412 from a traffic reporting service. Dynamic transportation matching system 206 may accordingly derive characteristics of transportation request 204 from environmental information 410 and/or traffic information 412.

PMVs may also report information to dynamic transportation matching system 206, and dynamic transportation matching system 206 may account for PMV data when determining a suitable PMV type that will fulfill transportation request 204. In the example of FIG. 4, personal mobility vehicles 414 and 418 are of personal mobility vehicle type 106. Personal mobility vehicles 414 and 418 may report status information 416 and 420, respectively, to dynamic transportation matching system 206. Similarly, personal mobility vehicles 422 and 426, which are of personal mobility vehicle type 108, may report status information 424 and 428, respectively, to dynamic transportation matching system 206. Examples of PMV statuses will be described in greater detail below.

Further examples of additional information that dynamic transportation matching system 206 may collect include, without limitation, weather information from a weather service, pollution information from a pollution tracking service, geographical mapping data from a mapping service, road condition information from a road condition tracking service, traffic information from a traffic reporting service, combinations of one or more of the same, status information of specific PMVs received from those specific PMVs, and/or any other information that may affect the suitability of a particular type of PMV. Although the example of FIG. 4 illustrates dynamic transportation matching system 202 as receiving status information and/or other vehicle data directly from individual PMVs, the systems and methods described herein may also retrieve vehicle data and/or status information from a database stored on a server, such as vehicle type data 326 in FIG. 3.

Once again returning to FIG. 3, dynamic transportation matching system 202 may be programmed to execute an evaluation module 314 that evaluates, either on behalf of or as part of dynamic transportation matching system 202 and based at least in part on characteristic 206, a fitness of matching at least one type of PMV to transportation request 204 against a fitness of matching at least one additional type of PMV to transportation request 204. Dynamic transportation matching system 202 may also be programmed to execute a matching module 316 that matches requesting device 104 to a specific PMV type based at least in part on comparing the fitness of matching various types of PMVs to transportation request 204, as described above.

In general, the term "fitness of matching" may refer to an overall level of suitability of a specific PMV type for transportation request 204. For example, evaluation module 314 may calculate a fitness score for each PMV type based on characteristics of transportation request 204, features of an anticipated travel route, ambient conditions, statuses and/or physical locations of PMVs included within a PMV type, etc. Evaluation module 314 may also consider specific models of PMV within a broader category. For example, evaluation module 314 may evaluate the suitability of various models of PMV based on identifying characteristics of those models of PMV. These identifying characteristics may include a maximum speed, a torque output, a maximum battery capacity, a loading capacity, a transport capability, and/or any other suitable identifying characteristic of a specific model of PMV. For example, evaluation module 314 may evaluate various models of PMV for a transportation request that involves delivering a bulky package to an address on a steep hill. Evaluation module 314 may accordingly determine that a model of bicycle that includes baskets and is capable of outputting sufficient torque to climb a steep hill represents a more suitable match to this transportation request than a model of bicycle that does not include baskets or a model that outputs insufficient torque to climb a steel hill.

Evaluation module 314 may combine this information into a numerical fitness score using any suitable mathematical formula and/or algorithm. Matching module 316 may then use the fitness scores of each PMV type and/or model when determining an appropriate PMV type and/or model to fulfill transportation request 204.

As an illustrated example, and with returning reference to FIG. 4, evaluation module 314 may combine information included in transportation request 204, location information 408, environmental 410, traffic information 412 and status information 416 and 420 to determine a fitness score for personal mobility vehicle type 106. As may be appreciated from this example, matching module 316 may also be able to use this information to match requesting device 104 to a specific PMV based on the status information of that specific PMV. For example, and as will be described in greater detail below, matching module 316 may determine that personal mobility vehicle type 106 is the most suitable vehicle type for fulfilling transportation request 204. Matching module 316 may then determine that status information 416 of personal mobility vehicle 414 indicates that personal mobility vehicle 414 is the most suitable PMV of personal mobility vehicle type 106 out of all PMVs included within personal mobility vehicle type 106.

Figure 5:
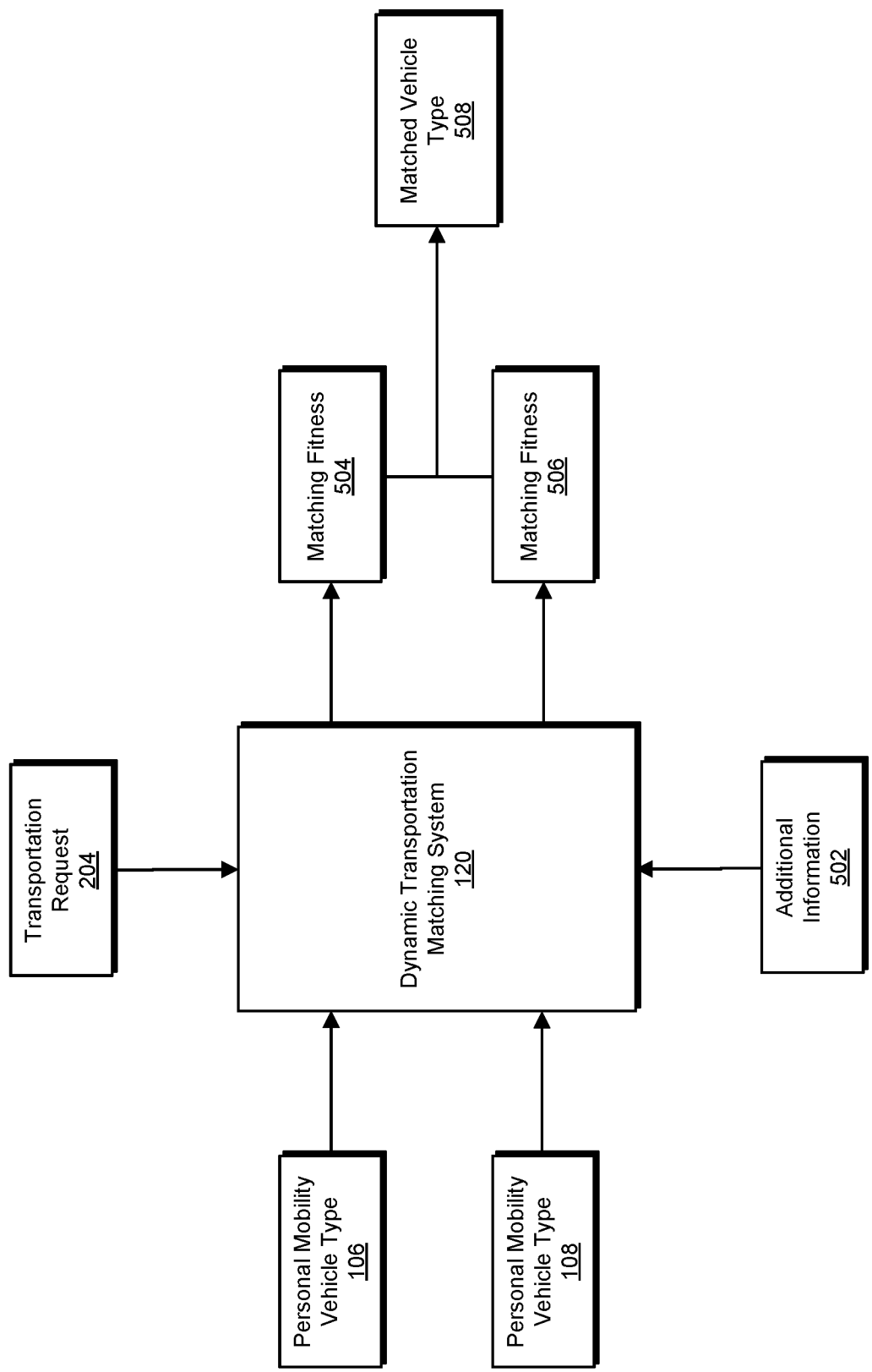
FIG. 5 is an additional block diagram of an example system for matching transportation requests to personal mobility vehicles.

FIG. 5 is a block diagram of an example system that compares the matching fitnesses of differing types of PMV as part of determining an ideal PMV to fulfill transportation request 204. As shown in FIG. 5, dynamic transportation matching system 120 may receive transportation request 204 and additional information 502, as described above in connection with reception module 310 and analysis module 312. Dynamic transportation matching system 120 may also receive and/or retrieve information describing personal mobility vehicle types 106 and 108. Dynamic transportation matching system 120 may then calculate matching fitness 504 for personal mobility vehicle type 106, and matching fitness 506 for personal mobility vehicle type 108. In this example, matching fitness 504 and matching fitness 506 may each represent numerical fitness scores for the corresponding personal mobility vehicle type, as described above. Dynamic transportation matching system 120 may then compare matching fitness 504 against matching fitness 506 to determine matched vehicle type 508. Although the example of FIG. 5 compares two personal mobility vehicle types, dynamic transportation matching system 120 may compare matching fitnesses of any number of personal mobility vehicle types.

Additionally or alternatively, the term "fitness of matching" may refer to an outcome of a decision algorithm. In these embodiments, evaluation module 314 may use the various elements of information derived from transportation request 204 and/or other sources as inputs into a decision algorithm that returns an optimal PMV type and/or a specific optimal PMV to match to requesting device 104. Such decision algorithms may be implemented in a variety of ways. For example, a decision algorithm may be implemented as a decision tree, with each node in the decision tree representing a point of differentiation between differing types of PMV.

Figure 6:
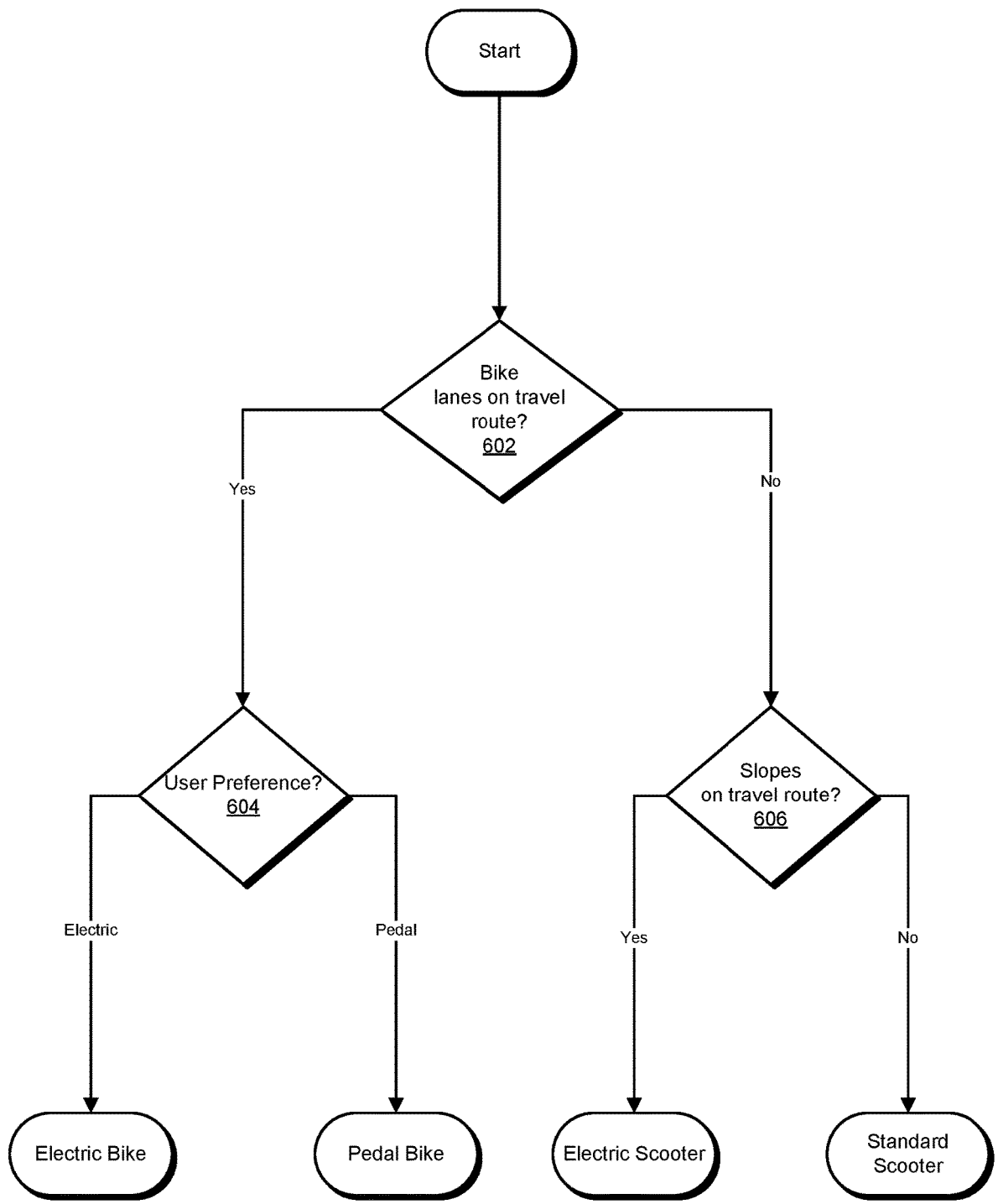
FIG. 6 is a flow diagram of an example decision tree for matching transportation requests to personal mobility vehicles.

FIG. 6 is a flow diagram of an example decision tree that evaluation module 314 may use to determine an ideal PMV type for matching to requesting device 104. In the example of FIG. 6, evaluation module 314 may, at step 602, determine whether an anticipated travel route of the transportation requestor includes bike lanes. If the anticipated travel route includes bike lanes, evaluation module 314 may proceed to step 604 and check a requestor profile of the transportation requestor to determine a requestor preference of the transportation requestor. If the requestor profile indicates that the transportation requestor prefers electric bikes, then evaluation module 314 may cause matching module 316 to match requesting device 104 to an electric bike. Conversely, if evaluation module 314 determines that the transportation requestor prefers pedal bikes at step 604, evaluation module 314 may cause matching module 316 to match requesting device 104 to a pedal bike.

Returning to step 602 of FIG. 6, evaluation module 314 may determine that there are no bike lanes on the anticipated travel route. In this example, evaluation module 314 may proceed to step 606 and check whether slopes above a certain angle are present on the anticipated travel route. In the event that slopes are present, evaluation module 314 may cause matching module 316 to match requesting device 104 to an electric scooter. In the event that slopes are not present, evaluation module 314 may instead cause matching module 316 to match requesting device 104 to a standard, unpowered scooter.

As may be appreciated from the examples and descriptions provided herein, FIG. 6 illustrates a simplified decision tree involving binary decisions at each decision node. In some embodiments, a single decision node may branch to three, four, or more results. Furthermore, decision nodes may be interconnected in any suitable way rather than branching to distinct, separate paths as shown in FIG. 6.

In some embodiments, dynamic transportation matching system 120 may generate a ranked list of personal mobility vehicles and/or personal mobility vehicle types based on the fitness scores of each personal mobility vehicle and/or personal mobility vehicle type. Dynamic transportation matching system 120 may then prompt transportation requestor 102 to select a personal mobility vehicle type and/or a specific personal mobility vehicle through a user interface of requesting device 104.

Evaluation module 314 may additionally or alternatively analyze an anticipated travel route of transportation requestor 102. As described above, the systems and methods described herein may receive and/or identify an anticipated travel route of transportation requestor 102 as part of matching requesting device 104 to an appropriate personal mobility vehicle type. In these examples, evaluation module 314 may identify one or more route features that are associated with the anticipated travel route. For example, evaluation module 314 may identify a travel distance covered by the anticipated travel route, a type of travel surface (e.g., pavement, gravel, wooden planks, etc.) along a portion of the anticipated travel route, a slope of the travel surface along a portion of the anticipated travel route, a type of travel infrastructure present along a portion of the anticipated travel route, and/or any other suitable information about the anticipated travel route that the systems and methods described herein may use to determine a fitness of matching a particular PMV type to requesting device 104.

Figure 8:
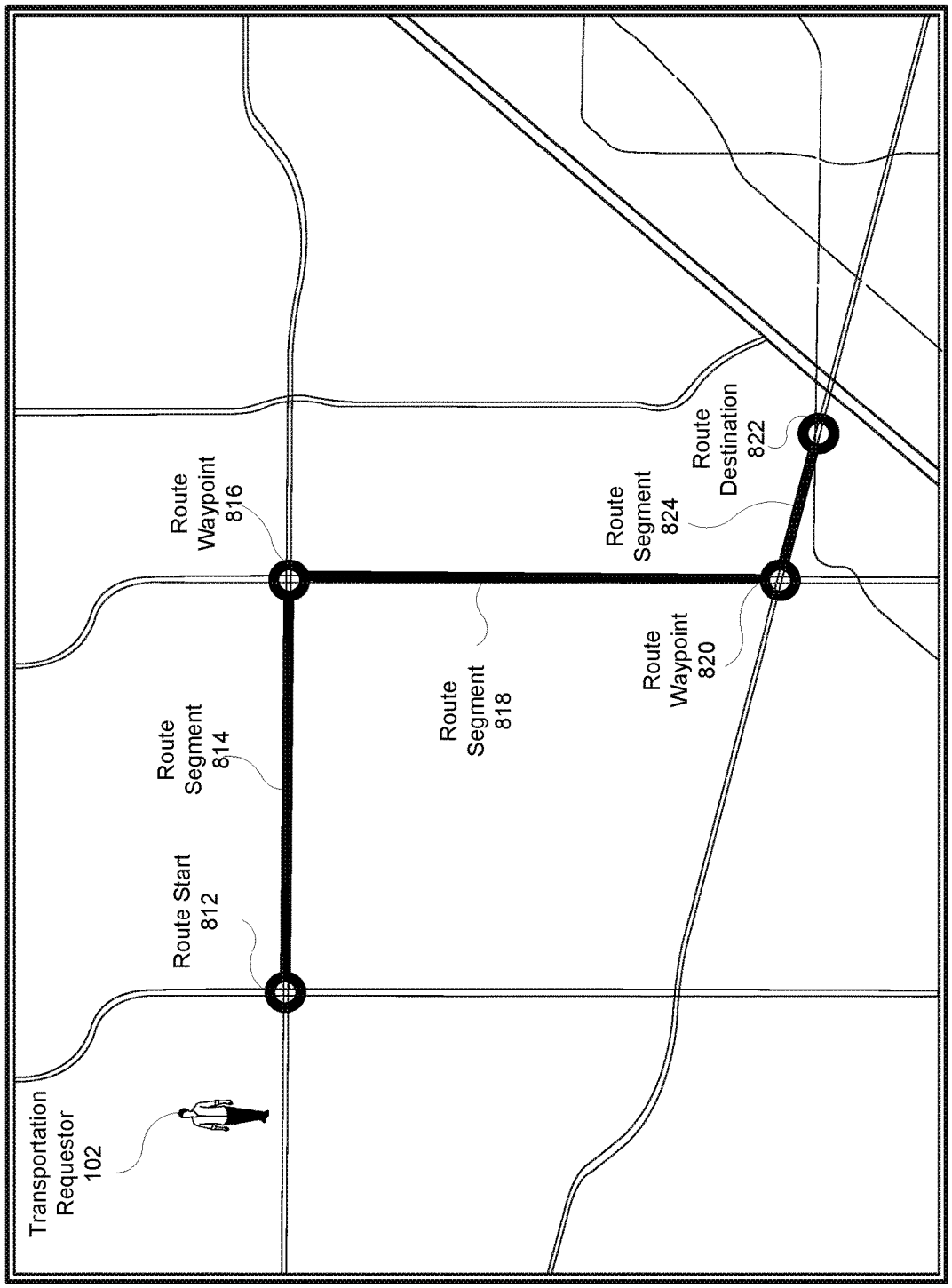
FIG. 8 is an illustration of an example travel route that may be declared as part of a transportation request.

FIG. 8 is a diagram of an example travel route. As shown in FIG. 8, a travel route may include several waypoints that divide the route into segments. In the example of FIG. 8, the travel route includes a route start 812 that represents a point at which transportation requestor 102 may desire to embark upon a personal mobility vehicle. The anticipated travel route then proceeds along route segment 814 until it reaches route waypoint 816, then further proceeds along route segment 818 until route waypoint 810. Similarly, the anticipated travel route may proceed from route waypoint 820 along route segment 824 until it reaches route destination 822. Each of route segments 814, 818, and 824 may represent segments of the anticipated travel route with different defining characteristics. For example, route segment 814 may represent a residential neighborhood that includes streets with sidewalks but no designated bike lanes. Route segment 818 may represent a larger street that includes higher speed vehicular traffic but also includes designated bike lanes, but no sidewalks. Finally, route segment 824 may represent a pedestrian bridge that incorporates a wooden plank travel surface. Evaluation module 314 may obtain data about each route segment through a third-party mapping service and/or through a database of travel infrastructure information that is maintained by dynamic transportation matching system 202.

In some embodiments, transportation requestor 102 may not be physically present at route start 712 when transportation requestor 102 requests access to a PMV. However, evaluation module 314 may ensure that requesting device 104 is matched to a PMV type that is present within a predetermined degree of physical proximity to requesting device 104. For example, evaluation module 314 may assign matching fitnesses to PMVs with a sharp drop-off in matching fitness for PMVs that are more than one-quarter of a mile from the current location of requesting device 104 to ensure that transportation requestors do not need to travel for an undue amount of time to reach their matched PMV.

In further embodiments, evaluation module 314 may calculate an expected time at which requesting device 104 is expected to be present at route start 712. Evaluation module 314 may calculate an expected time of arrival for transportation requestor 102 at route start 712 based on the current location of requesting device 104 and/or mapping data associated with a route connecting the current location of requesting device 104 to route start 712. As a specific example, transportation requestor 102 may represent an individual who is at work but would like to reserve a PMV to ride on their way home. In this example, transportation requestor 102 may provide the systems and methods described herein with a time at which they will leave their work building. Evaluation module 314 may accordingly calculate a walking time from the work building to route start 712. Evaluation module 314 may then increase the fitness of matching requesting device 104 to a PMV type based on that PMV type being available at route start 712 at the time that evaluation module 314 has determined that requesting device 104 will be present at route start 712.

In some examples, transportation request 204 may include a desired travel time and/or a desired time of arrival at route destination 722. In these embodiments, evaluation module 314 may assign a PMV type to requesting device 104 based on a travel speed of that PMV type. For example, an electric bike may be able to traverse the anticipated travel route significantly faster than an unpowered scooter. Evaluation module 314 may accordingly assign these faster PMVs to transportation requestors with stricter time requirements and assign PMVs with lesser travel speeds to transportation requestors with less strict time requirements.

In some embodiments, dynamic transportation matching system 202 may seek to balance the availability of various PMV types at various locations. For example, dynamic transportation matching system 202 may attempt to maintain a certain number of bikes and a certain number of scooters available at specific physical locations, such as a public transit hub and/or a train station. In these examples, dynamic transportation matching system 202 may track the stock of PMVs present in vehicle pools at each tracked physical location and match requesting devices to personal mobility vehicles based on those requesting devices declaring travel routes that will transport PMVs to or from specific vehicle pools.

Figure 7:
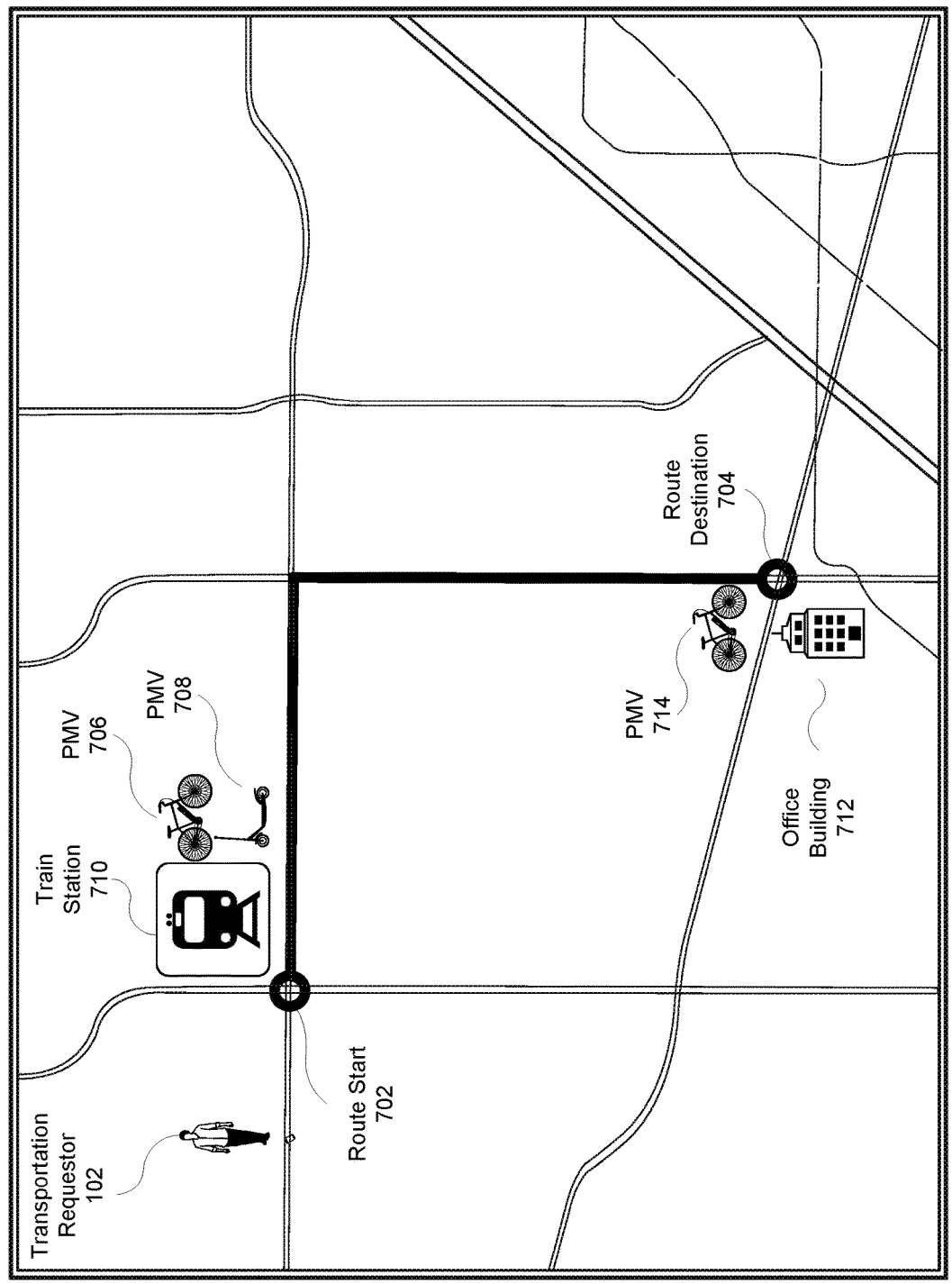
FIG. 7 is an illustration of an example transportation requestor who receives a personal mobility vehicle assignment based on vehicle deficiencies at a particular location.

For example, and as illustrated in FIG. 7, dynamic transportation matching system 202 may track vehicle pools at train station 710 and office building 712. These geographical features may represent areas where transportation requestors are likely to request transportation to or from. Transportation requestor 102 may, through a user interface of requesting device 104, request transportation to travel between these two physical locations. The anticipated travel route of transportation requestor 102 is illustrated as including route start 702 and route destination 704. Train station 710 at route start 702 may host a variety of different PMVs. In the example of FIG. 7, the area around train station 710 hosts PMV 706 (a bicycle) and PMV 708 (a scooter). Similarly, the area around office building 712 may include PMV 714 (a bike). In this embodiment, dynamic transportation matching system 202 may then identify a deficiency in the area around office building 712 that may be remedied by transferring a PMV from the area around train station 710. For example, dynamic transportation system 202 may determine that another transportation requestor (not illustrated) is requesting a scooter to be available near office building 712 later in the day. However, the area around office building 712 does not currently have scooters available. Dynamic transportation matching system 202 may accordingly increase the fitness of matching requesting device 104 with PMV 708 (the scooter near train station 710) as this match may ensure that PMV 708 is available to the second transportation requestor.

As described above, evaluation module 314 may account for device statuses when matching requesting device 104 to a PMV type. For example, evaluation module 314 may match requesting device 104 to a PMV type that includes PMVs with sufficient range to cover an anticipated travel route. As an additional example, evaluation module 314 may attempt to balance mileage travelled across PMVs managed by dynamic transportation matching system 202. Evaluation module 314 may retrieve and/or receive device status data from a server-side database (e.g., vehicle type data 326 in FIG. 3) and/or directly from onboard sensors integrated into PMVs managed by dynamic transportation matching system 202. As a specific example, evaluation module 314 may query onboard status modules of various PMVs to determine status metrics associated with each PMV. Evaluation module 314 may perform these queries on a periodic basis to update a database such as vehicle type data 326 and/or perform queries as prompted by dynamic transportation matching system 202 upon receiving a transportation request from requesting device 104. Evaluation module 314 may then evaluate the statuses of the various PMVs to determine specific PMVs and/or PMV types that are capable of fulfilling the transportation request.

Figure 9:
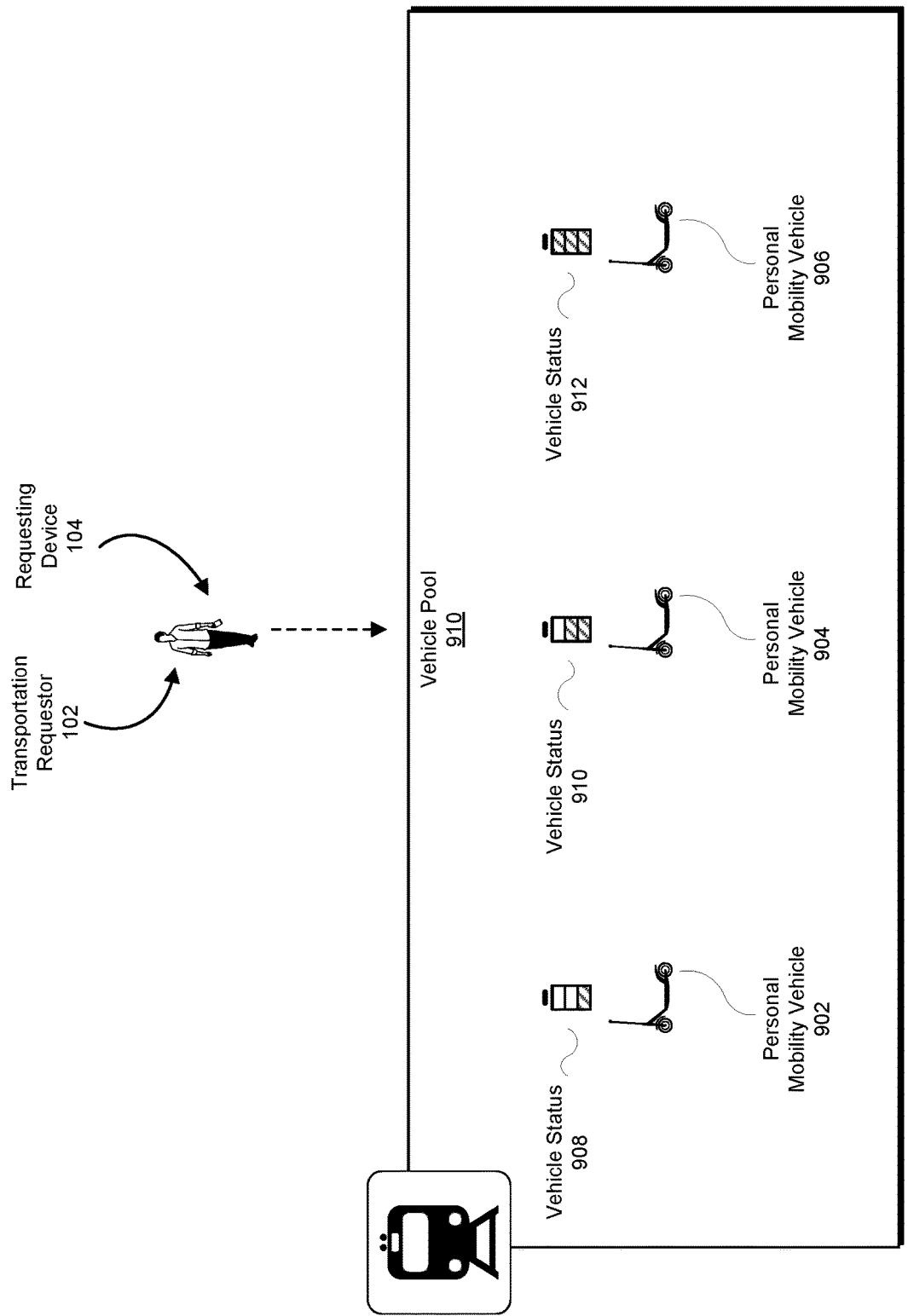
FIG. 9 is an illustration of an example vehicle pool that includes multiple personal mobility vehicles with varying statuses.

FIG. 9 is an illustration showing various personal mobility vehicles in a vehicle pool 910 that may be used to fulfill a transportation request. In the example of FIG. 9, transportation requestor 102 may use requesting device 104 to request transportation from dynamic transportation matching system 202. Dynamic transportation matching system 202 may identify vehicle pool 910, which may represent PMVs present in the physical area around a landmark such as train station 710 in FIG. 7. This landmark may be located near a starting point of an anticipated travel route, as described above. In this example, vehicle pool 910 includes three electric scooters, illustrated as personal mobility vehicles 902, 904, and 906. Each electric scooter may be equipped with a network communications device and may periodically report battery charge and other status metrics, such as operability, mileage, etc. to dynamic transportation system 202. Specifically, personal mobility vehicle 902 may report vehicle status 908, personal mobility vehicle 904 may report vehicle status 910, and personal mobility vehicle 906 may report vehicle status 912.

Given that dynamic transportation matching system 202 has already determined that the scooters are physically present near the start of an anticipated travel route of transportation requestor 102, dynamic transportation matching system 202 may then compare vehicle statuses 908, 910, and 912 to determine which PMV is most suited for fulfilling the transportation request. In this example, transportation requestor 102 may have declared an anticipated travel route that covers a relatively long range and requires a PMV that is capable of covering a long distance without having to recharge. Dynamic transportation matching system 202 may accordingly select a PMV with a high battery charge as indicated by the relevant vehicle status. In the example of FIG. 9, dynamic transportation matching system may determine that vehicle status 912 indicates that personal mobility vehicle 906 has sufficient travel range to fulfill the transportation request, while vehicle statuses 908 and 910 indicate that personal mobility vehicles 902 and 904 do not have sufficient travel range remaining. PMV assignments that use personal mobility vehicle 902 or 904 may accordingly involve a vehicle transfer partway through the travel route. Dynamic transportation matching system 202 may accordingly grant an increased fitness of matching to personal mobility vehicle 906 over personal mobility vehicles 902 and 904.

Figure 10:
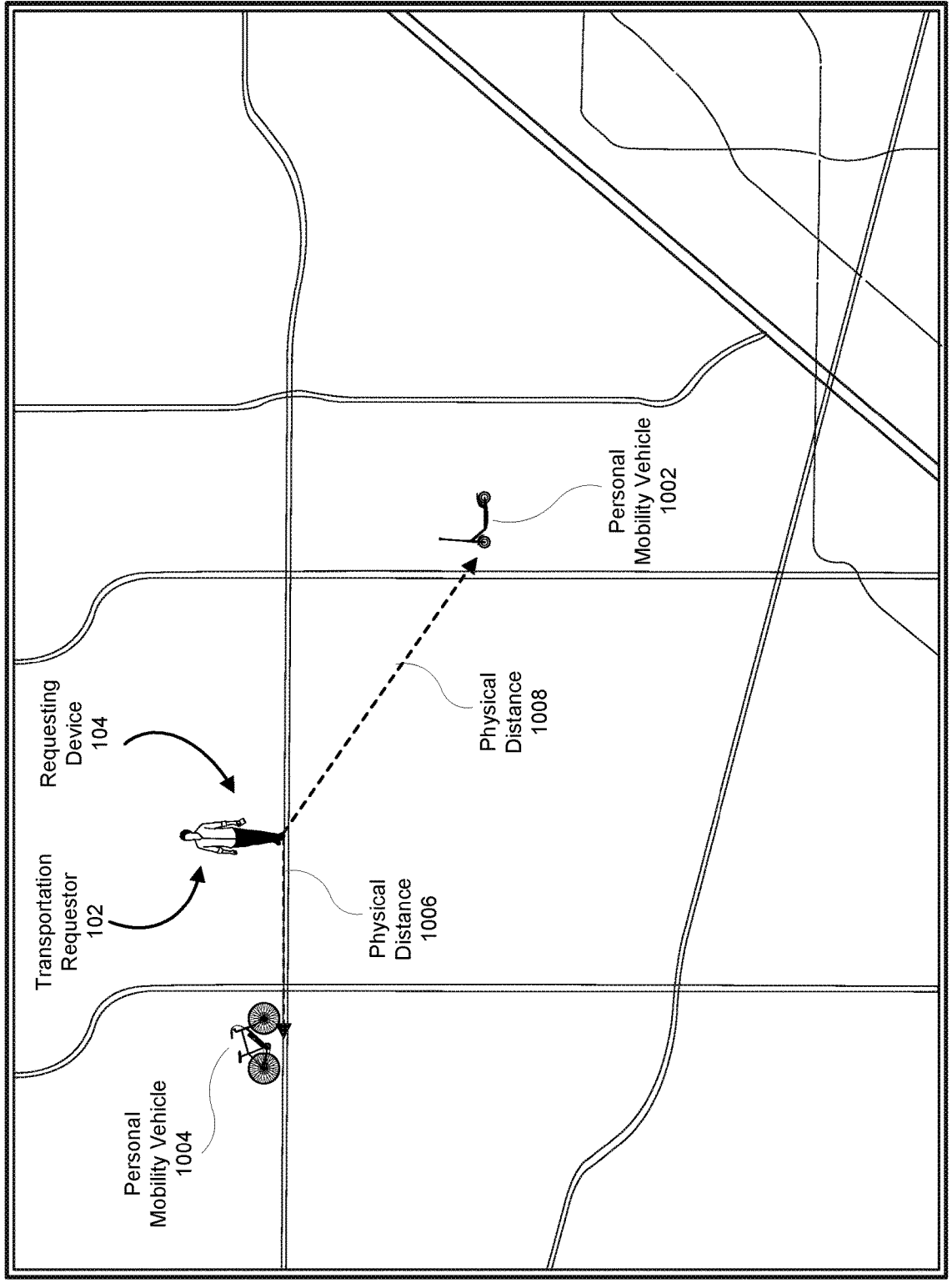
FIG. 10 is an illustration of a transportation requestor within proximity to a certain personal mobility vehicle but farther away from a second personal mobility vehicle.

As described above, evaluation module 314 may evaluate the fitness of matching requesting device 104 to a PMV type based on the physical proximity of requesting device 104 to PMVs of that type. For example, evaluation module 314 may disregard PMVs that are outside a predetermined physical proximity to requesting device 104, thereby ensuring that transportation requestor 102 is able to access a matched PMV within a reasonable amount of time and with a reasonable amount of effort. Similarly, evaluation module 314 may grant PMVs that are closer to requesting device 104 a higher matching fitness than PMVs that are farther away. For example, and as illustrated in FIG. 10, transportation requestor 102 may request transport from dynamic transportation matching system 202. Evaluation module 314 may, through a combination of geolocation information received from requesting device 104, PMV geolocation information received from personal mobility vehicles 1002 and 1004, and/or PMV location data stored by dynamic transportation matching system 202 (not illustrated in FIG. 10), determine that personal mobility vehicle 1002 is within physical distance 1006 of requesting device 104 while personal mobility vehicle 1004 is within physical distance 1008 of requesting device 104. Evaluation module 314 may grant personal mobility vehicle 1002 a higher matching fitness than personal mobility vehicle 1004 by virtue of physical distance 1006 being shorter than physical distance 1008.

Although the example of FIG. 10 shows straight-line distances between requesting device 104 and the various illustrated PMVs, dynamic transportation matching system may alternatively account for actual travel paths that transportation requestor 102 may use to reach personal mobility vehicle 1002 and/or personal mobility vehicle 1004. For example, transportation requestor 102 would be unable to walk through a wall to reach personal mobility vehicle 1002. Evaluation module 314 may accordingly calculate physical distance 1006 based on a walkable pedestrian route that connects the current location of requesting device 104 to the physical location (or anticipated physical location) of personal mobility vehicle 1002.

In some embodiments, dynamic transportation matching system 202 may receive a group of transportation requests from transportation requestors who are travelling as a party. In these embodiments, matching the transportation requests to corresponding PMVs may include determining that each of the transportation requests are part of the same group. For example, each transportation request may include a group identifier that designates, within dynamic transportation matching system 202, the associated requesting device as part of a specific travel group. Dynamic transportation system 202 may then search for suitable PMVs to fulfill the group request based on the transportation requests. For example, and similarly to the analysis described above, dynamic transportation matching system 202 may analyze an anticipated travel route of the group, user preferences of the travel group, etc. Moreover, dynamic transportation matching system 202 may search for a group of PMVs that are all within a predetermined degree of physical proximity to each other, thereby allowing each member of the travel group to embark on a PMV at approximately the same time. In some embodiments, dynamic transportation matching system 202 may match members of the travel group to PMVs that are capable of transporting more than one individual at a time. In these embodiments, dynamic transportation matching system 202 may ensure that the total carrying capacity of all the PMVs assigned to the travel group is capable of transporting all members of the travel group.

Figure 11:
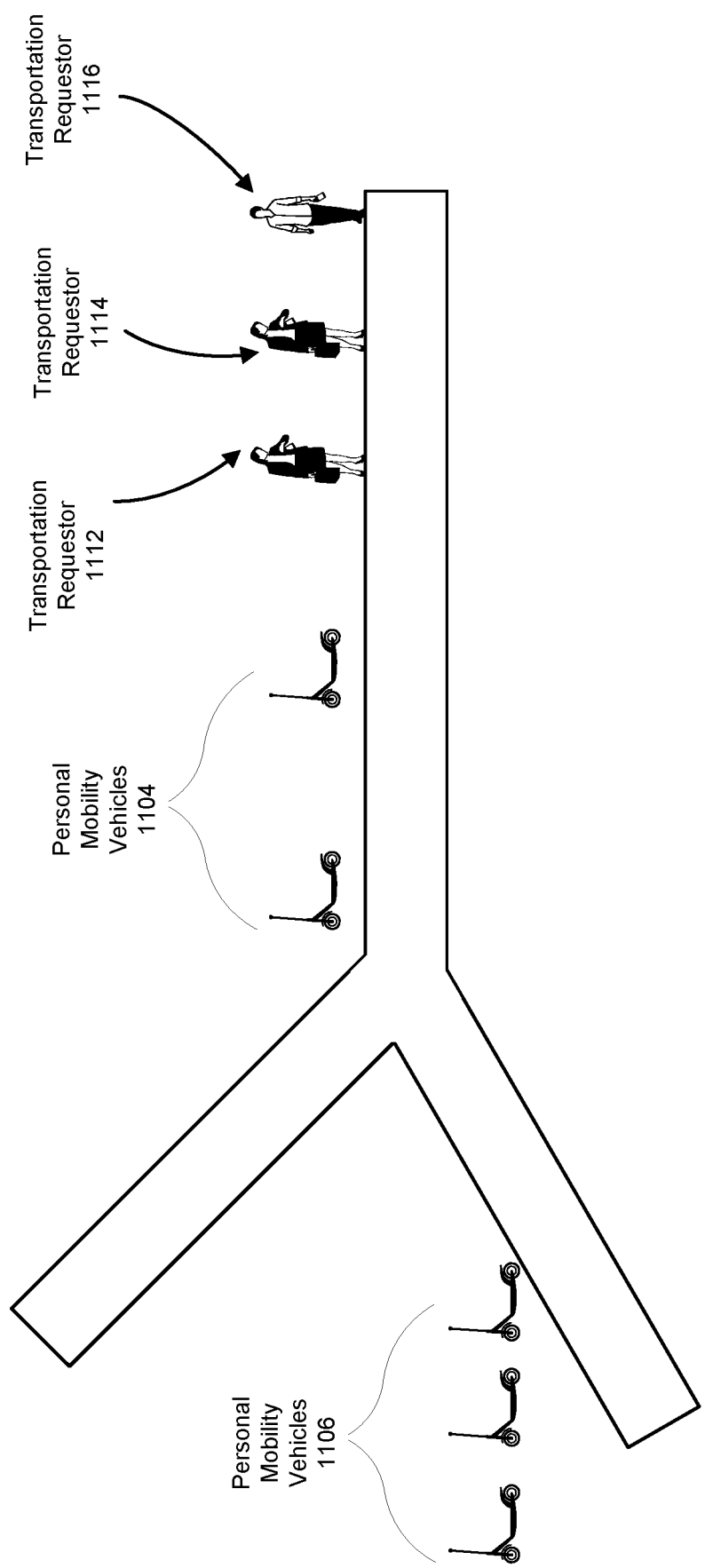
FIG. 11 is an illustration of a group of transportation requestors requesting access, as a group, to personal mobility vehicles.

FIG. 11 is an illustrated example of transportation requestors travelling as a group. In this example, transportation requestors 1112, 1114, and 1116 may have submitted transportation requests to dynamic transportation matching system 202 and indicated that they intend to travel as a group. Dynamic transportation matching system 202 may accordingly search for an appropriate group of PMVs to fulfill the group request(s). In the example of FIG. 11, dynamic transportation matching system 202 may match transportation requestors 1112, 1114, and 1116 to personal mobility vehicles 1106 rather than the closer-by personal mobility vehicles 1104 based on there being a sufficient number of PMVs present in personal mobility vehicles 1106 to transport transportation requestors 1112, 1114, and 1116. Personal mobility vehicles 1104, by contrast, does not include a sufficient number of PMVs to transport transportation requestors 1112, 1114, and 1116 as a group. By matching transit groups in this way, the systems and methods described herein may allow travel groups to obtain and ride PMVs together while avoiding awkward situations where some members of the group are riding PMVs while other members of the group are still attempting to acquire transportation.

In some embodiments, one or more of the systems described herein may interact with transportation requestors through user interfaces of requesting devices. For example, dynamic transportation matching system 202 may match a requesting device to a specific PMV. Dynamic transportation matching system 202 may then present, through a user interface of the requesting device, a prompt asking the transportation requestor to confirm their acceptance of the PMV assignment. In embodiments where dynamic transportation matching system 202 identifies more than one suitable PMV for fulfilling a request, dynamic transportation matching system 202 may display a list of suitable PMVs through the user interface of the requesting device and prompt the transportation requestor to select one of the available PMVs. Once dynamic transportation matching system 202 has confirmed that the transportation requestor accepts the PMV assignment, dynamic transportation matching system 202 may then render the designated PMV available to the transportation requestor.

As described in greater detail above, the systems and methods described herein may increase user satisfaction by matching transportation requests to the most suitable vehicle for a particular situation. For example, the systems and methods described herein may receive a request for transportation from a requesting device and match the requesting device to a specific personal mobility vehicle based on analyzing and comparing a variety of factors. Differing types of PMVs may offer different advantages in different contexts. For example, bikes may be better suited to transporting packages than scooters or may perform better in adverse weather conditions. The systems and methods described herein may take these advantages into account when matching transportation requestors to various available PMVs. Similarly, the systems and methods described herein may account for user-supplied preferences, travel times, and/or terrain over which the PMV will travel. By determining an ideal PMV type to fulfill a transportation request in this way, the systems and methods described herein may increase user satisfaction by matching transportation requests to the most suitable vehicle for a particular situation.

Figure 12:
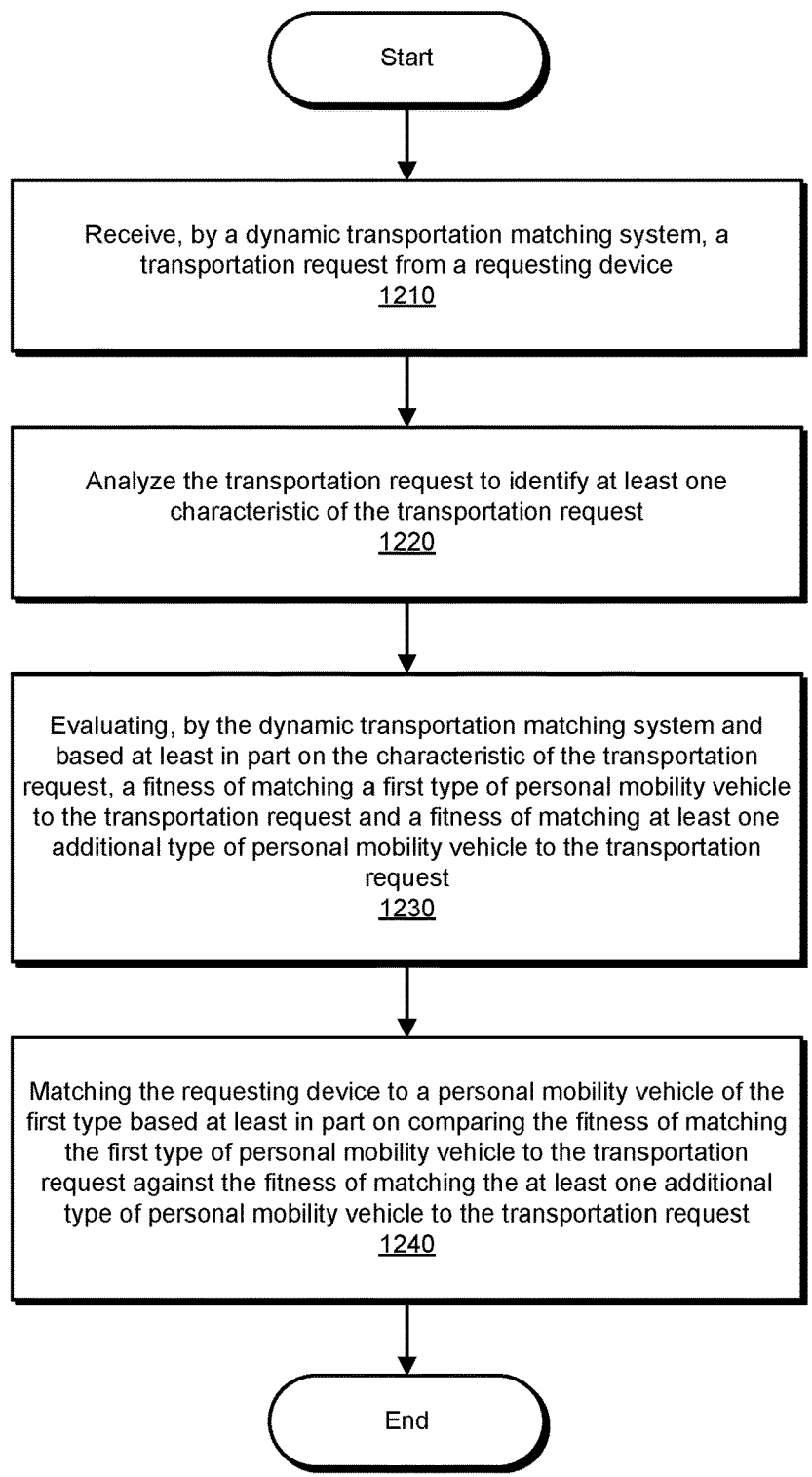
FIG. 12 is a flow diagram of an example method for matching transportation requests to personal mobility vehicles.

FIG. 12 illustrates an example method 1200 for matching transportation requests to personal mobility vehicles. As illustrated in FIG. 12, at step 1210, one or more of the systems described herein may receive, by a dynamic transportation matching system a transportation request from a requesting device.

At step 1220 of FIG. 12, one or more of the systems described herein may analyze the transportation request to identify at least one characteristic of the transportation request.

In some embodiments, the characteristic of the transportation request may include an anticipated travel route of a transportation requestor associated with the requesting device.

At step 1230 of FIG. 12, one or more of the systems described herein may evaluate, by the dynamic transportation matching system and based at least in part on the characteristic of the transportation request, a fitness of matching a first type of personal mobility vehicle to the transportation request and a fitness of matching at least one additional type of personal mobility vehicle to the transportation request.

In embodiments where the characteristic of the transportation request includes an anticipated travel route, performing the evaluation may include (i) identifying, based at least in part on an analysis of the anticipated travel route, a collection of route features that are associated with the anticipated travel route, and (ii) performing the evaluation based at least in part on the collection of route features that are associated with the anticipated travel route. The collection of route features may include one or more of (i) a travel distance covered by the anticipated travel route, (ii) a type of travel surface along a portion of the anticipated travel route, (iii) a slope of a travel surface along a portion of the anticipated travel route, and/or (iv) a type of travel infrastructure that is present along a portion of the anticipated travel route.

In further embodiments, performing the evaluation may include performing the evaluation based at least in part on determining an optimization metric specified by the dynamic transportation matching system. Determining the optimization metric may include (i) calculating predicted travel times for each available type of personal mobility vehicle, (ii) identifying, based on a transportation-requestor profile of the transportation requestor, an ability metric that indicates an ability of the transportation requestor to interact with personal mobility vehicles, (iii) identifying, based on the transportation-requestor profile, a vehicle-type preference of the transportation requestor, (iv) identifying, by the dynamic transportation matching system, safety metrics associated with each available type of personal mobility vehicle, and/or (v) identifying, by the dynamic transportation matching system, transportation capabilities of each available type of personal mobility vehicle.

At step 1240 of FIG. 12, one or more of the systems described herein may match the requesting device to a personal mobility vehicle of the first type based at least in part on comparing the fitness of matching the first type of personal mobility vehicle to the transportation request against the fitness of matching the at least one additional type of personal mobility vehicle to the transportation request.

In some examples, matching the requesting device to the personal mobility vehicle of the first type may include determining that the dynamic transportation matching system indicates a deficiency in the quantity of the first type of personal mobility device at a destination of the anticipated travel route. In these examples, matching the requesting device to the personal mobility vehicle of the first type may include matching the requesting device to the personal mobility vehicle of the first type to remedy the deficiency at the destination of the anticipated travel route.

In further examples, matching the requesting device to the personal mobility vehicle of the first type may include (i) determining, based at least in part on querying an onboard status monitor of the personal mobility vehicle of the first type, a status metric of the personal mobility vehicle that describes a physical state of the personal mobility vehicle, and (ii) determining that the status metric indicates that the personal mobility vehicle is capable of fulfilling the transportation request.

In some embodiments, matching the requesting device to the personal mobility vehicle of the first type may include determining that the personal mobility of the first type is within a predetermined degree of physical proximity to the requesting device.

Additionally or alternatively, matching the requesting device to the personal mobility vehicle may include (i) calculating an expected time at which the requesting device is expected to be physically present at a predicted location, and (ii) determining that the personal mobility vehicle will be physically located within proximity to the predicted location of the requesting device at the expected time.

In some examples, matching the requesting device to the personal mobility vehicle of the first type may include selecting the personal mobility vehicle of the first type based at least in part on environmental conditions. In these examples, the environmental conditions may include one or more of (i) weather conditions, (ii) traffic conditions, (iii) pollution levels, (iv) road conditions along an anticipated travel route of the transportation requestor, and/or (v) the time of day at which the transportation requestor is expected to travel along the anticipated travel route.

Moreover, matching the requesting device to the personal mobility vehicle of the first type may include selecting a specific model of personal mobility device based at least in part on an identifying characteristic of that specific model of personal mobility device. The identifying characteristic may include one or more of (i) a maximum speed of the particular model, (ii) a torque output of the particular model, (iii) a maximum battery capacity of the particular model, (iv) a loading capacity of the particular model, and/or (v) a transport capability of the particular model.

In some embodiments, matching the transportation requestor to the personal mobility vehicle of the first type may include determining that the requesting device is part of a group of requesting devices that have been designated within the dynamic transportation matching system as a travel group. In these embodiments, matching the transportation requestor to the personal mobility vehicle may include identifying a group of personal mobility vehicles of the first type, wherein the number of personal mobility vehicles in the group of personal mobility vehicles equals the number of requesting devices in the group of requesting devices. The above-described method may then include matching each requesting device in the group of requesting devices to a corresponding personal mobility vehicle in the group of personal mobility vehicles.

Figure 13:
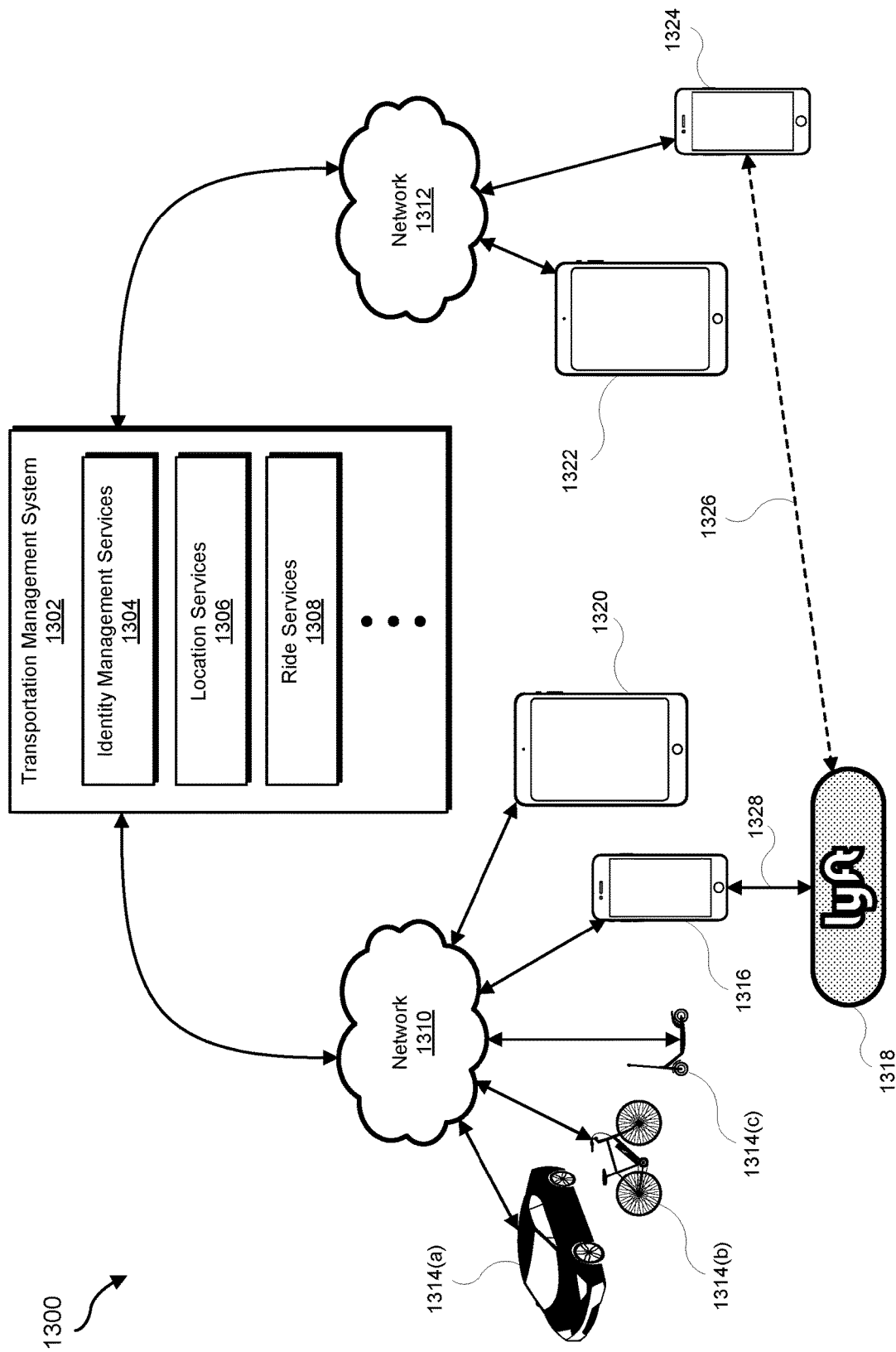
FIG. 13 is an illustration of an example requestor/provider management environment.

FIG. 13 shows a transportation management environment 1300, in accordance with various embodiments. As shown in FIG. 13, a transportation management system 1302 may run one or more services and/or software applications, including identity management services 1304, location services 1306, ride services 1308, and/or other services. Although FIG. 13 shows a certain number of services provided by transportation management system 1302, more or fewer services may be provided in various implementations. In addition, although FIG. 13 shows these services as being provided by transportation management system 1302, all or a portion of any of the services may be processed in a distributed fashion. For example, computations associated with a service task may be performed by a combination of transportation management system 1302 (including any number of servers, databases, etc.), one or more devices associated with a provider (e.g., devices integrated with managed vehicles 1314(a), 1314(b), and/or 1314(c); provider computing devices 1316 and tablets 1320; and transportation management vehicle devices 1318), and/or more or more devices associated with a ride requestor (e.g., the requestor's computing devices 1324 and tablets 1322). In some embodiments, transportation management system 1302 may include one or more general purpose computers, server computers, clustered computing systems, cloud-based computing systems, and/or any other computing systems or arrangements of computing systems. Transportation management system 1302 may be configured to run any or all of the services and/or software components described herein. In some embodiments, the transportation management system 1302 may include an appropriate operating system and/or various server applications, such as web servers capable of handling hypertext transport protocol (HTTP) requests, file transfer protocol (FTP) servers, database servers, etc.

In some embodiments, identity management services 1304 may be configured to perform authorization services for requestors and providers and/or manage their interactions and/or data with transportation management system 1302. This may include, e.g., authenticating the identity of providers and determining that they are authorized to provide services through transportation management system 1302. Similarly, requestors' identities may be authenticated to determine whether they are authorized to receive the requested services through transportation management system 1302. Identity management services 1304 may also manage and/or control access to provider and/or requestor data maintained by transportation management system 1302, such as driving and/or ride histories, vehicle data, personal data, preferences, usage patterns as a ride provider and/or as a ride requestor, profile pictures, linked third-party accounts (e.g., credentials for music and/or entertainment services, social-networking systems, calendar systems, task-management systems, etc.) and any other associated information. Transportation management system 1302 may also manage and/or control access to provider and/or requestor data stored with and/or obtained from third-party systems. For example, a requester or provider may grant transportation management system 1302 access to a third-party email, calendar, or task management system (e.g., via the user's credentials). As another example, a requestor or provider may grant, through a mobile device (e.g., 1316, 1320, 1322, or 1324), a transportation application associated with transportation management system 1302 access to data provided by other applications installed on the mobile device. In some examples, such data may be processed on the client and/or uploaded to transportation management system 1302 for processing.

In some embodiments, transportation management system 1302 may provide ride services 1308, which may include ride matching and/or management services to connect a requestor to a provider. For example, after identity management services module 1304 has authenticated the identity a ride requestor, ride services module 1308 may attempt to match the requestor with one or more ride providers. In some embodiments, ride services module 1308 may identify an appropriate provider using location data obtained from location services module 1306. Ride services module 1308 may use the location data to identify providers who are geographically close to the requestor (e.g., within a certain threshold distance or travel time) and/or who are otherwise a good match with the requestor. Ride services module 1308 may implement matching algorithms that score providers based on, e.g., preferences of providers and requestors; vehicle features, amenities, condition, and/or status; providers' preferred general travel direction and/or route, range of travel, and/or availability; requestors' origination and destination locations, time constraints, and/or vehicle feature needs; and any other pertinent information for matching requestors with providers. In some embodiments, ride services module 1308 may use rule-based algorithms and/or machine-learning models for matching requestors and providers.

Transportation management system 1302 may communicatively connect to various devices through networks 1310 and/or 1312. Networks 1310 and 1312 may include any combination of interconnected networks configured to send and/or receive data communications using various communication protocols and transmission technologies. In some embodiments, networks 1310 and/or 1312 may include local area networks (LANs), wide-area networks (WANs), and/or the Internet, and may support communication protocols such as transmission control protocol/Internet protocol (TCP/IP), Internet packet exchange (IPX), systems network architecture (SNA), and/or any other suitable network protocols. In some embodiments, data may be transmitted through networks 1310 and/or 1312 using a mobile network (such as a mobile telephone network, cellular network, satellite network, or other mobile network), a public switched telephone network (PSTN), wired communication protocols (e.g., Universal Serial Bus (USB), Controller Area Network (CAN)), and/or wireless communication protocols (e.g., wireless LAN (WLAN) technologies implementing the IEEE 902.11 family of standards, Bluetooth, Bluetooth Low Energy, Near Field Communication (NFC), Z-Wave, and ZigBee). In various embodiments, networks 1310 and/or 1312 may include any combination of networks described herein or any other type of network capable of facilitating communication across networks 1310 and/or 1312.

In some embodiments, transportation management vehicle device 1318 may include a provider communication device configured to communicate with users, such as drivers, passengers, pedestrians, and/or other users. In some embodiments, transportation management vehicle device 1318 may communicate directly with transportation management system 1302 or through another provider computing device, such as provider computing device 1316. In some embodiments, a requestor computing device (e.g., device 1324) may communicate via a connection 1326 directly with transportation management vehicle device 1318 via a communication channel and/or connection, such as a peer-to-peer connection, Bluetooth connection, NFC connection, ad hoc wireless network, and/or any other communication channel or connection. Although FIG. 13 shows particular devices communicating with transportation management system 1302 over networks 1310 and 1312, in various embodiments, transportation management system 1302 may expose an interface, such as an application programming interface (API) or service provider interface (SPI) to enable various third parties which may serve as an intermediary between end users and transportation management system 1302.

In some embodiments, devices within a vehicle may be interconnected. For example, any combination of the following may be communicatively connected: vehicle 1314, provider computing device 1316, provider tablet 1320, transportation management vehicle device 1318, requestor computing device 1324, requestor tablet 1322, and any other device (e.g., smart watch, smart tags, etc.). For example, transportation management vehicle device 1318 may be communicatively connected to provider computing device 1316 and/or requestor computing device 1324. Transportation management vehicle device 1318 may establish communicative connections, such as connections 1326 and 1328, to those devices via any suitable communication technology, including, e.g., WLAN technologies implementing the IEEE 902.11 family of standards, Bluetooth, Bluetooth Low Energy, NFC, Z-Wave, ZigBee, and any other suitable short-range wireless communication technology.

In some embodiments, users may utilize and interface with one or more services provided by the transportation management system 1302 using applications executing on their respective computing devices (e.g., 1316, 1318, 1320, and/or a computing device integrated within vehicle 1314), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In some embodiments, vehicle 1314 may include a vehicle-integrated computing device, such as a vehicle navigation system, or other computing device integrated with the vehicle itself, such as the management system of an autonomous vehicle. The computing device may run on any suitable operating systems, such as Android®, iOS®, macOS®, Windows®, Linux®, UNIX®, or UNIX®-based or Linux®-based operating systems, or other operating systems. The computing device may further be configured to send and receive data over the Internet, short message service (SMS), email, and various other messaging applications and/or communication protocols. In some embodiments, one or more software applications may be installed on the computing device of a provider or requestor, including an application associated with transportation management system 1302. The transportation application may, for example, be distributed by an entity associated with the transportation management system via any distribution channel, such as an online source from which applications may be downloaded. Additional third-party applications unassociated with the transportation management system may also be installed on the computing device. In some embodiments, the transportation application may communicate or share data and resources with one or more of the installed third-party applications.

Figure 14:
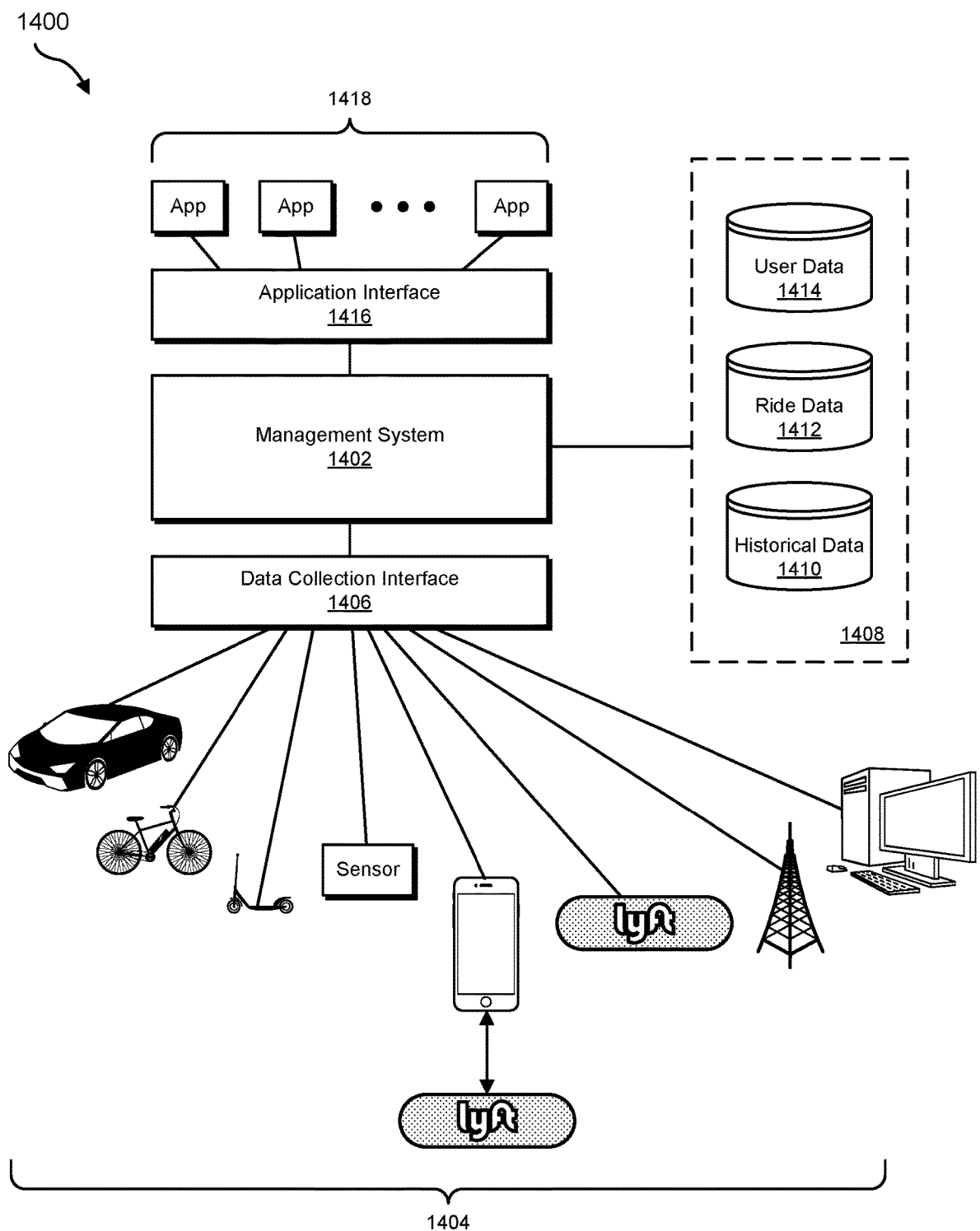
FIG. 14 is an illustration of an example data collection and application management system.

FIG. 14 shows a data collection and application management environment 1400, in accordance with various embodiments. As shown in FIG. 14, management system 1402 may be configured to collect data from various data collection devices 1404 through a data collection interface 1406. As discussed above, management system 1402 may include one or more computers and/or servers or any combination thereof. Data collection devices 1404 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 1406 can include, e.g., an extensible device framework configured to support interfaces for each data collection device. In various embodiments, data collection interface 1406 may be extended to support new data collection devices as they are released and/or to update existing interfaces to support changes to existing data collection devices. In various embodiments, data collection devices may communicate with data collection interface 1406 over one or more networks. The networks may include any network or communication protocol as would be recognized by one of ordinary skill in the art, including those networks discussed above.

As shown in FIG. 14, data received from data collection devices 1404 can be stored in data store 1408. Data store 1408 may include one or more data stores, such as databases, object storage systems and services, cloud-based storage services, and other data stores. For example, various data stores may be implemented on a non-transitory storage medium accessible to management system 1402, such as historical data store 1410, ride data store 1412, and user data store 1414. Data stores 1408 can be local to management system 1402, or remote and accessible over a network, such as those networks discussed above or a storage-area network or other networked storage system. In various embodiments, historical data 1410 may include historical traffic data, weather data, request data, road condition data, or any other data for a given region or regions received from various data collection devices. Ride data 1412 may include route data, request data, timing data, and other ride related data, in aggregate and/or by requestor or provider. User data 1414 may include user account data, preferences, location history, and other user-specific data. Although certain data stores are shown by way of example, any data collected and/or stored according to the various embodiments described herein may be stored in data stores 1408.

As shown in FIG. 14, an application interface 1416 can be provided by management system 1402 to enable various apps 1418 to access data and/or services available through management system 1402. Apps 1418 may run on various user devices (including provider and requestor computing devices, such as those discussed above) and/or may include cloud-based or other distributed apps configured to run across various devices (e.g., computers, servers, or combinations thereof). Apps 1418 may include, e.g., aggregation and/or reporting apps which may utilize data 1408 to provide various services (e.g., third-party ride request and management apps). In various embodiments, application interface 1416 can include an API and/or SPI enabling third party development of apps 1418. In some embodiments, application interface 1416 may include a web interface, enabling web-based access to data 1408 and/or services provided by management system 1402. In various embodiments, apps 1418 may run on devices configured to communicate with application interface 1416 over one or more networks. The networks may include any network or communication protocol as would be recognized by one of ordinary skill in the art, including those networks discussed above, in accordance with an embodiment of the present disclosure.

While various embodiments of the present disclosure are described in terms of a ridesharing service in which the ride providers are human drivers operating their own vehicles, in other embodiments, the techniques described herein may also be used in environments in which ride requests are fulfilled using autonomous vehicles. For example, a transportation management system of a ridesharing service may facilitate the fulfillment of ride requests using both human drivers and autonomous vehicles.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive a transportation request to be transformed, transform the transportation request into request characteristics, output a result of the transformation to a database of request characteristics, use a result of the transformation to determine an optimal PMV to fulfill the transportation request, and report the optimal PMV to a dynamic transportation matching system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method, the method comprising:

receiving, by a dynamic transportation matching system, a transportation request from a requesting device;

analyzing the transportation request to identify at least one characteristic of the transportation request, wherein the at least one characteristic of the transportation request comprises at least an anticipated travel route of a transportation requestor associated with the requesting device;

evaluating, by the dynamic transportation matching system and based at least in part on the at least one characteristic of the transportation request, a fitness of matching a first type of personal mobility vehicle to the transportation request and a fitness of matching an additional type of personal mobility vehicle to the transportation request, wherein the first type of personal mobility vehicle and the additional type of personal mobility vehicle each comprises one of a bicycle or a scooter; and matching the requesting device to a personal mobility vehicle associated with the first type of personal mobility vehicle based at least in part on comparing the fitness of matching the first type of personal mobility vehicle to the transportation request against the fitness of matching the additional type of personal mobility vehicle to the transportation request.

2. The method of claim 1, wherein the evaluating comprises:
   identifying, based at least in part on an analysis of the anticipated travel route, a plurality of route features that are associated with the anticipated travel route; and
   performing an evaluation based at least in part on the plurality of route features that are associated with the anticipated travel route.

3. The method of claim 2, wherein the plurality of route features comprises one or more of:
   a travel distance covered by the anticipated travel route;
   a type of travel surface along a portion of the anticipated travel route;
   a slope of a travel surface along the portion of the anticipated travel route; or
   a type of travel infrastructure present along the portion of the anticipated travel route.

4. The method of claim 1, wherein matching the requesting device to the personal mobility vehicle associated with the first type of personal mobility vehicle comprises:
   determining that the dynamic transportation matching system indicates a deficiency in a quantity of personal mobility vehicles associated with the first type of personal mobility vehicle at a destination of the anticipated travel route; and
   matching the requesting device to the personal mobility vehicle associated with the first type of personal mobility vehicle to remedy the deficiency at the destination of the anticipated travel route.

5. The method of claim 1, wherein matching the requesting device to the personal mobility vehicle associated with the first type of personal mobility vehicle comprises matching the requesting device to a particular model of personal mobility vehicle based on at least one identifying characteristic of the particular model of personal mobility vehicle.

6. The method of claim 5, wherein the identifying characteristic of the particular model of personal mobility vehicle comprises one of:
   a maximum speed of the particular model;
   a torque output of the particular model;
   a maximum battery capacity of the particular model;
   a loading capacity of the particular model; or
   a transport capability of the particular model.

7. The method of claim 1, wherein the evaluating is based at least in part on determining an optimization metric specified by the dynamic transportation matching system, wherein determining the optimization metric comprises at least one of:
   calculating predicted travel times that will be incurred by using the first type personal mobility vehicle and the additional type of personal mobility vehicle;
   identifying, based on a transportation-requestor profile of the transportation requestor, an ability metric associated with an interaction of the transportation requestor with personal mobility vehicles;
   identifying, based on the transportation-requestor profile, a vehicle-type preference of the transportation requestor;
   identifying, by the dynamic transportation matching system, safety metrics associated with the first type of personal mobility vehicle and the additional type of personal mobility vehicle; or
   identifying, by the dynamic transportation matching system, transportation capabilities of the first type of personal mobility vehicle and the additional type of personal mobility vehicle.

8. The method of claim 1, wherein matching the requesting device to the personal mobility vehicle associated with the first type of personal mobility vehicle comprises:
   determining, based at least in part on querying an onboard status monitor of the personal mobility vehicle associated with the first type of personal mobility vehicle, a status metric of the personal mobility vehicle; and
   determining that the status metric of the personal mobility vehicle indicates that the personal mobility vehicle is capable of fulfilling the transportation request.

9. The method of claim 1, wherein matching the requesting device to the personal mobility vehicle associated with the first type of personal mobility vehicle comprises determining that the personal mobility vehicle associated with the first type of personal mobility vehicle is within a physical proximity to the requesting device.

10. The method of claim 1, wherein matching the requesting device to the personal mobility vehicle associated with the first type of personal mobility vehicle comprises:
    calculating an expected time at which the requesting device is expected to be physically present at a predicted location; and
    determining that the personal mobility vehicle will be physically located within proximity to the predicted location of the requesting device at the expected time.

11. The method of claim 1, wherein matching the requesting device to the personal mobility vehicle associated with the first type of personal mobility vehicle comprises selecting the personal mobility vehicle based at least in part on weather information or traffic information.

12. The method of claim 11, wherein the traffic information comprises one or more of:
    road conditions along the anticipated travel route; or
    a time of day at which the transportation requestor is expected to travel along the anticipated travel route.

13. The method of claim 1, wherein matching the transportation requestor to the personal mobility vehicle associated with the first type of personal mobility vehicle comprises:

determining that the requesting device is part of a group of requesting devices that have been designated within the dynamic transportation matching system as a travel group;

identifying a plurality of personal mobility vehicles, wherein a number of personal mobility vehicles in the plurality of personal mobility vehicles equals a number of requesting devices in the group of requesting devices; and matching each requesting device in the group of requesting devices to a corresponding personal mobility vehicle in the plurality of personal mobility vehicles.

14. A system comprising at least one physical computer processor and a memory, the memory having stored thereon instructions that, when executed by the at least one physical computer processor of the system, cause the system to:

receive, by a dynamic transportation matching system, a transportation request from a requesting device;

analyze the transportation request to identify at least one characteristic of the transportation request, wherein the at least one characteristic of the transportation request comprises at least an anticipated travel route of a transportation requestor associated with the requesting device;

evaluate, by the dynamic transportation matching system and based at least in part on the at least one characteristic of the transportation request, a fitness of matching a first type of personal mobility vehicle to the transportation request and a fitness of matching an additional type of personal mobility vehicle to the transportation request, wherein the first type of personal mobility vehicle and the additional type of personal mobility vehicle each comprises one of a bicycle or a scooter; and match the requesting device to a personal mobility vehicle associated with the first type of personal mobility vehicle based at least in part on comparing the fitness of matching the first type of personal mobility vehicle to the transportation request against the fitness of matching the additional type of personal mobility vehicle to the transportation request.

15. The system of claim 14, wherein the evaluating comprises:

identifying, based at least in part on an analysis of the anticipated travel route, a plurality of route features that are associated with the anticipated travel route; and performing an evaluation based at least in part on the plurality of route features that are associated with the anticipated travel route.

16. The system of claim 15, wherein the plurality of route features comprises one or more of:

a travel distance covered by the anticipated travel route;

a type of travel surface along a portion of the anticipated travel route;

a slope of a travel surface along the portion of the anticipated travel route; or a type of travel infrastructure present along the portion of the anticipated travel route.

17. The system of claim 14, wherein matching the requesting device to the personal mobility vehicle associated with the first type of personal mobility vehicle comprises:

determining that the dynamic transportation matching system indicates a deficiency in a quantity of personal mobility vehicles associated with the first type of personal mobility vehicle at a destination of the anticipated travel route; and matching the requesting device to the personal mobility vehicle associated with the first type of personal mobility vehicle to remedy the deficiency at the destination of the anticipated travel route.

18. The system of claim 14, wherein the evaluating is based at least in part on determining an optimization metric specified by the dynamic transportation matching system, wherein determining the optimization metric comprises at least one of:

calculating predicted travel times that will be incurred by using the first type personal mobility vehicle and the additional type of personal mobility vehicle;

identifying, based on a transportation-requestor profile of the transportation requestor, an ability metric associated with an interaction of the transportation requestor with personal mobility vehicles;

identifying, based on the transportation-requestor profile, a vehicle-type preference of the transportation requestor;

identifying, by the dynamic transportation matching system, safety metrics associated with the first type of personal mobility vehicle and the additional type of personal mobility vehicle; or identifying, by the dynamic transportation matching system, transportation capabilities of the first type of personal mobility vehicle and the additional type of personal mobility vehicle.

19. The system of claim 14, wherein matching the requesting device to the personal mobility vehicle associated with the first type of personal mobility vehicle comprises:

determining, based at least in part on querying an onboard status monitor of the personal mobility vehicle associated with the first type of personal mobility vehicle, a status metric of the personal mobility vehicle; and determining that the status metric of the personal mobility vehicle indicates that the personal mobility vehicle is capable of fulfilling the transportation request.

20. A non-transitory computer-readable medium comprising one or more computer readable instructions that, when executed by at least one processor of a computing device, cause the computing device to:

receive, by a dynamic transportation matching system, a transportation request from a requesting device;

analyze the transportation request to identify at least one characteristic of the transportation request, wherein the at least one characteristic of the transportation request comprises at least an anticipated travel route of a transportation requestor associated with the requesting device;

evaluate, by the dynamic transportation matching system and based at least in part on the at least one characteristic of the transportation request, a fitness of matching a first type of personal mobility vehicle to the transportation request and a fitness of matching an additional type of personal mobility vehicle to the transportation request, wherein the first type of personal mobility vehicle and the additional type of personal mobility vehicle each comprises one of a bicycle or a scooter; and match the requesting device to a personal mobility vehicle associated with the first type of personal mobility vehicle based at least in part on comparing the fitness of matching the first type of personal mobility vehicle to the transportation request against the fitness of matching the additional type of personal mobility vehicle to the transportation request.

\* \* \* \* \*